(12) United States Patent
Guillard et al.

(10) Patent No.: US 10,332,038 B2
(45) Date of Patent: Jun. 25, 2019

(54) TRAVEL INVENTORY DEMAND MODELING

(71) Applicant: Amadeus S.A.S., Biot (FR)

(72) Inventors: Bastien Guillard, Antibes (FR); Nicolas Carrez, Grasse (FR); Pierre-Yves Rault, Antibes (FR)

(73) Assignee: AMADEUS S.A.S., Biot (FR)

( * ) Notice: Subject to any disclaimer, the term of this patent is extended or adjusted under 35 U.S.C. 154(b) by 1197 days.

(21) Appl. No.: 14/598,830

(22) Filed: Jan. 16, 2015

(65) Prior Publication Data
US 2016/0210564 A1    Jul. 21, 2016

(51) Int. Cl.
*G06Q 10/02* (2012.01)
*G06Q 50/14* (2012.01)
*G06Q 30/02* (2012.01)

(52) U.S. Cl.
CPC ......... *G06Q 10/02* (2013.01); *G06Q 30/0284* (2013.01); *G06Q 50/14* (2013.01)

(58) Field of Classification Search
CPC .. G06Q 10/02; G06Q 10/047; G06Q 30/0611; G06Q 50/14
See application file for complete search history.

(56) References Cited

U.S. PATENT DOCUMENTS

| 7,328,166 | B1 | 2/2008 | Geoghegan et al. | |
|---|---|---|---|---|
| 7,392,228 | B2 | 6/2008 | Ternoey et al. | |
| 2006/0200370 | A1* | 9/2006 | Ratliff | G06Q 10/02 705/5 |
| 2009/0037349 | A1* | 2/2009 | Katz | G06Q 30/0283 705/400 |
| 2010/0250291 | A1* | 9/2010 | Walker | G06Q 10/02 705/5 |
| 2011/0022428 | A1* | 1/2011 | Parker | G06Q 10/02 705/6 |

(Continued)

FOREIGN PATENT DOCUMENTS

EP    2079044    7/2009

OTHER PUBLICATIONS

Ratliff, R. M., Venkateshwara Rao, B., Narayan, C. P., & Yellepeddi, K. (2008). A multi-flight recapture heuristic for estimating unconstrained demand from airline bookings. Journal of Revenue and Pricing Management, 7(2), (Year: 2008).*

(Continued)

*Primary Examiner* — Michael P Harrington
(74) *Attorney, Agent, or Firm* — Thompson Hine LLP

(57) ABSTRACT

Systems, methods, and computer program products for analyzing a database system that manages production travel objects. A plurality of records is retrieved from a database of an electronic ticket server. Each record includes at least one travel object segment and a value object. The travel segment object of each record is analyzed to determine at least one geographical identification object for each record. A geographical identification object correlated value object is computed based on the value object for each record. A demand model is generated in a memory based at least in part on the geographical identification object and the geographical identification object correlated value object of each record. Booking demand is modeled for production travel objects managed by the database system for a range of simulation days with the demand model.

20 Claims, 26 Drawing Sheets

(56) References Cited

U.S. PATENT DOCUMENTS

2012/0271679 A1  10/2012  Schroder et al.
2013/0290150 A1  10/2013  Weerahandi et al.

OTHER PUBLICATIONS

Weatherford, L. R. (2013). Improved revenues from various unconstraining methods in a passenger origin-destination simulator (PODS) environment with semi-restricted fares. Journal of Revenue and Pricing Management, 12(1), 60-82. (Year: 2013).*

Pölt, S. (2004). How to aggregate origin and destination availability. Journal of Revenue and Pricing Management, 3(2), 191-199. Retrieved from https://search.proquest.com/docview/214494068?accountid=14753 (Year: 2004).*

European Search Report and European Search Opinion; European Patent Application No. 15290011.4; (dated May 11, 2015).

European Search Report and European Search Opinion; European Patent Application No. 15290010.6; (dated May 12, 2015).

* cited by examiner

430

| ATTRIBUTE | TYPE | COMMENTS |
|---|---|---|
| 1 Node  432 | M | |
| 1.1 Number of bookings  434 | M | = Sum of the Booking data's "Booking weight" |
| 1.2 Sum of price  436 | M | = Sum of the Booking data's "Price" |
| 1.3 Booking data (1..n)  438 | M | |
| 1.3.1 Booking weight  440 | M | |
| 1.3.2 Fare weight  442 | M | |

FIG. 7B

| | MNL-AUH (482) | BKK-AUH (484) |
|---|---|---|
| 486 PNH-AUH | 1780 + 0 km | 504 + 0 km |
| 488 LPQ-AUH | 2088 + 0 km | 707 + 0 km |
| 490 HAN-AUH | 1771 + 0 km | 995 + 0 km |
| 492 SYX-AUH | 1306 + 0 km | 1058 + 0 km |
| 494 TPE-AUH | 1174 + 0 km | 2487 + 0 km |
| 496 CAN-AUH | 1276 + 0 km | 1705 + 0 km |
| 498 HKG-AUH | 1144 + 0 km | 1688 + 0 km |

| AggOnD | Cabin | POS |
|---|---|---|
| NCE-SIN | J | NCE |
| NCE-SIN | J | SIN |
| FRA-SIN | Y | FRA |
| FRA-SIN | Y | SIN |
| FRA-SIN | J | FRA |

| 1 Un-constrained nodes | | 738 |
|---|---|---|
| 1.1 Number of bookings | *Un-constrained* | 740 |
| 1.2 Sum of fare | *Un-constrained* | 742 |
| 1.3 Booking data (1..n) | | 744 |
| 1.3.1 booking | *Not synchronized* | 746 |
| 1.3.2 fare | *Not synchronized* | 748 |

FIG. 16A

| 1 Un-constrained nodes | | 738 |
|---|---|---|
| 1.1 Number of bookings | *Un-constrained* | 740 |
| 1.2 Sum of fare | *Un-constrained* | 742 |
| 1.3 Booking data (1..n) | | 744 |
| 1.3.1 booking | *Synchronized* | 746 |
| 1.3.2 fare | *Synchronized* | 748 |

FIG. 16B

| | | |
|---|---|---|
| 1 Nodes of other type | | 749 |
| 1.1 Number of bookings | *Not synchronized* | 750 |
| 1.2 Sum of fare | *Not synchronized* | 752 |
| 1.3 Booking data (1..n) | | 744 |
| 1.3.1 booking | *Synchronized* | 746 |
| 1.3.2 fare | *Synchronized* | 748 |

FIG. 16C

| | | |
|---|---|---|
| 1 Nodes of other type | | 749 |
| 1.1 Number of bookings | *Synchronized* | 750 |
| 1.2 Sum of fare | *Synchronized* | 752 |
| 1.3 Booking data (1..n) | | 744 |
| 1.3.1 booking | *Synchronized* | 746 |
| 1.3.2 fare | *Synchronized* | 748 |

FIG. 16D

| AggOnD | Number of demand |
|---|---|
| NCE-SIN | 3 |
| FRA-SIN | 2 |

FIG. 24A

| AggOnD | Number of demand | Cabin | POS |
|---|---|---|---|
| NCE-SIN | 3 | Y | NCE   1202 |
|  |  |  |  |
|  |  |  |  |
| FRA-SIN | 2 |  |  |
|  |  |  |  |

FIG. 24C

| AggOnD | Number of demand | Cabin | POS | Bkg class | |
|---|---|---|---|---|---|
| NCE-SIN | 3 | Y | NCE | A | _1202_ |
| | | | | | |
| | | | | | |
| FRA-SIN | 2 | | | | |
| | | | | | |

FIG. 24E

_1220_ (upper table)

| AggOnD | Number of demand | Cabin | POS | Bkg class | |
|---|---|---|---|---|---|
| NCE-SIN | 3 | Y | NCE | A | _1202_ |
| | | Y | SIN | A | _1242_ |
| | | Y | NCE | B | _1244_ |
| FRA-SIN | 2 | Y | FRA | A | _1246_ |
| | | J | SIN | D | _1248_ |

TRAVEL INVENTORY DEMAND MODELING

TECHNICAL FIELD

The invention is generally related to computers and data processing, and in particular to systems, methods, and computer program products for management of a database system, benchmarking of a database system, and evaluation of a database system.

BACKGROUND

Computer technology is increasingly used in the travel industry to manage and support travel reservations, as well as data associated therewith. In particular, third party reservation agents, such as travel agents, and/or customers (e.g., travelers) often utilize computer based devices to interface with a travel reservation system, such as a Global Distribution System (GDS), to book travel arrangements and/or travel related services for the customer. When reserving travel related services using such reservation terminals in communication with such travel reservation systems, a travel agent and/or customer may initiate a reservation session between a client device and the travel reservation system to book one or more travel inventory items corresponding to the travel related services (e.g., flights, hotels, rail transportation, dining reservations, etc.) for the customer during the reservation session. During the reservation session, the reservation system may interface with inventory systems of one or more travel merchants to book one or more travel inventory items of the travel merchants. Moreover, in the electronic travel reservation technology area, the inventory systems and/or reservation systems may comprise one or more database systems. In general, a travel inventory item refers to a unit or item from a saleable inventory of a travel merchant. For example, a travel inventory item of an airline may refer to a place on a segment, i.e. a place on a flight between an origin and destination, but generally does not refer to a specific physical seat. Each inventory system is configured to manage travel inventory items for a travel merchant, where such management may include determining availability and pricing for such travel inventory items.

Consequently, a need exists in the art for improved systems, methods, and computer program products for database management, database benchmarking, and database evaluation.

SUMMARY

Embodiments of the invention generally comprise methods, systems, and computer program products for modeling booking demand for travel inventory items managed by an inventory system. Consistent with embodiments of the invention, a ticket record is retrieved for each of a plurality of previously ticketed travel inventory items, where each ticket record includes at least one travel segment and a ticket price. At least one origin and destination (O&D) pair is determined for each ticket record based at least in part on the at least one travel segment of the ticket record. An O&D price is calculated for each O&D pair of each ticket record based at least in part on the ticket price of the ticket record. A demand model may be generated based at least in part on the at least one O&D pair and the O&D price of each ticket record. Booking demand for the travel inventory items of the inventory system may be modeled for a range of simulation days with the demand model.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 7B is a table that provides a data structure of a node of a booking tree model and/or demand model consistent with some embodiments of the invention.

FIGS. 16A-D illustrate an example synchronization of nodes of a booking tree model after unconstraining.

FIGS. 24A-F illustrate an example generation of booking demand lines that may be performed by the data processing system of FIG. 1.

DETAILED DESCRIPTION

Figure 1:
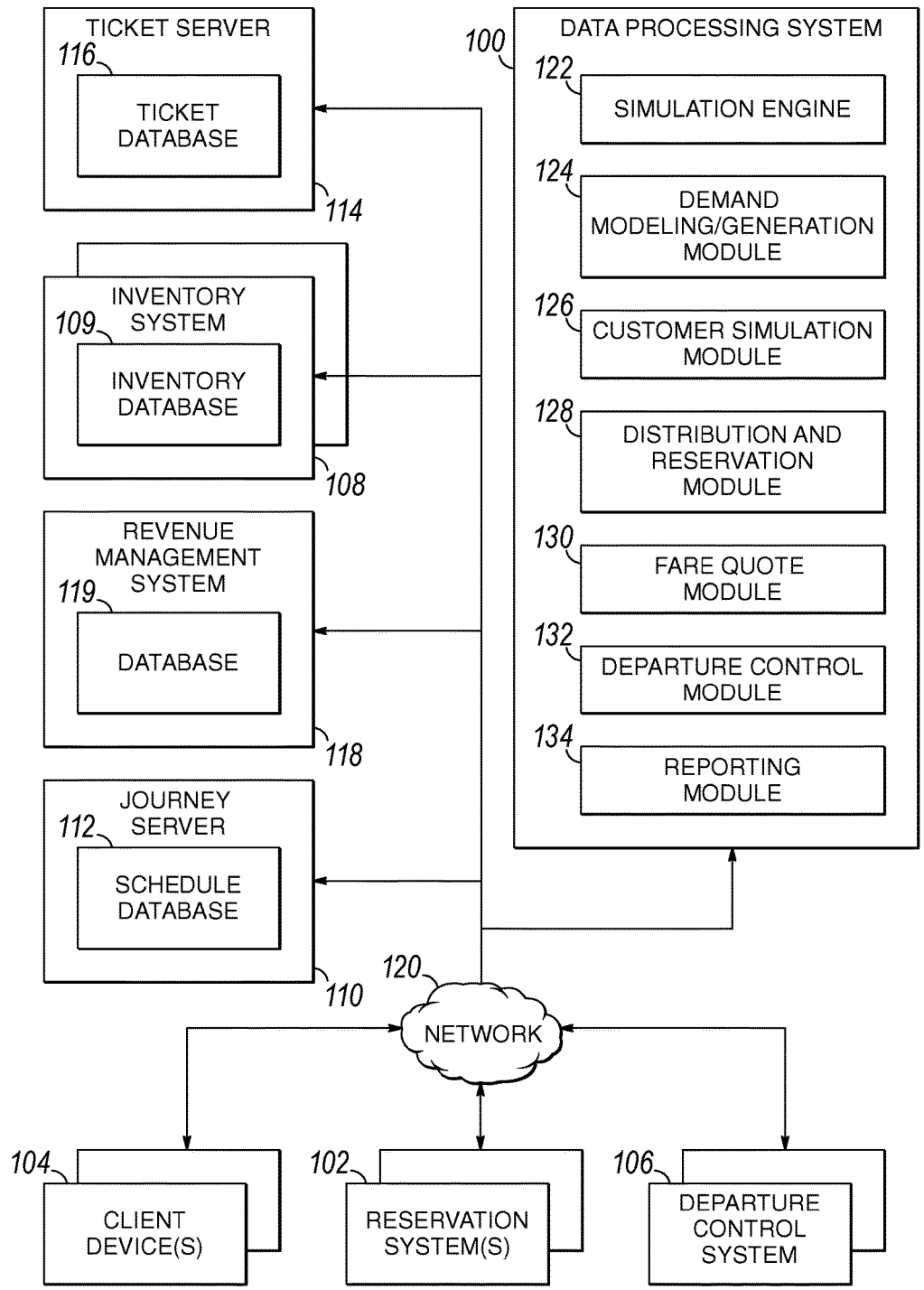
FIG. 1 is a block diagram of one or more reservation systems, one or more inventory systems, one or more client devices, and a data processing system consistent with embodiments of the invention.

Embodiments of the invention provide systems, methods, and computer program products for analyzing a database system that manages production travel objects. A plurality of records is retrieved from a database of an electronic ticket server. Each record includes at least one travel object segment and a value object. The travel segment object of each record is analyzed to determine at least one geographical identification object for each record. A geographical identification object correlated value object is computed based on the value object for each record. A demand model is generated in a memory based at least in part on the geographical identification object and the geographical identification object correlated value object of each record. Booking demand is modeled for production travel objects managed by the database system for a range of simulation days with the demand model. In some embodiments of the invention, the database system may be an inventory system, the travel objects may be travel inventory items, the records may be ticket records, the at least one travel object segment may be a travel segment, a value object may be a ticket price, and a geographical identification node may be an origin and destination (O&D) node and/or an aggregated O&D node.

Embodiments of the invention generate simulated demand requests for travel inventory items managed by a travel inventory system. In general, such simulated demand requests may be communicated to an inventory system of a travel merchant and thereby processed as travel requests. Hence, the simulated demand requests may be utilized to evaluate management of travel inventory items by an inventory system. In particular, the simulated demand requests may be processed by an inventory system based on travel inventory item availability determined by the inventory system and/or revenue management rules implemented at the inventory system. As should be appreciated, the simulated demand requests are therefore used to determine availability and pricing response of an inventory system based on actual travel inventory items (i.e., actual saleable inventory) taking into account actual availability (i.e., based on actual bookings) and actual revenue management rules (i.e., bid prices, yield, etc.). The travel inventory items, the availability, bid prices/yield, and/or other such data related to offered travel inventory items may be referred to as production travel inventory items, production availability, production bid prices/yield, and collectively as production data.

As will be appreciated and described herein, a travel segment generally corresponds to travel between a departure point and an arrival point, where a travel inventory item represents a saleable unit for a travel service between the departure point and the arrival point for the travel segment. Travel segments may be combined to form a journey having an origin and a destination (O&D) pair. For example, a first travel inventory item may correspond to a travel segment from city A to city B, and a second travel inventory item may correspond to a travel segment from city B to city C. The journey would have an origin of city A and a destination of city C, which may be referred to as an O&D pair of A-C. Furthermore, a ticketed travel inventory item is an inventory item for which a booking has been finalized and a payment has been collected. Consistent with embodiments of the invention, a ticket record generally stores passenger information, travel segments, and/or a ticket price for one or more ticketed travel inventory items.

Turning now to the figures, and particularly to FIG. 1, this figure provides a block diagram illustrating the one or more devices and/or systems consistent with embodiments of the invention. As shown in FIG. 1, a data processing system 100 may be in communication with one or more systems generally associated with travel reservation and travel inventory management. In particular, a reservation system 102 that may be implemented as one or more servers, one or more client devices 104, one or more departure control systems 106, an inventory system 108 that may be implemented as one or more servers and includes an inventory database 109, a journey server 110 that includes a schedule database 112, a ticket server 114 that includes a ticket database 116, and/or a revenue management system 118 that includes a database 119 and is associated with the inventory system 108 may be in communication over a communication network 120. The communication network 120 may comprise the Internet, a local area network (LAN), a wide area network (WAN), a cellular voice/data network, one or more high speed bus connections, and/or other such types of communication networks. As will be appreciated, the reservation system 102 may correspond to a global distribution system (GDS). As discussed, the ticket server 114 may comprise the ticket database 116. The inventory database 109 stores production travel inventory items and associated inventory counters. In general, the ticket database 116 stores ticket records for ticketed travel inventory items, including travel segments for a ticket, passenger information for the ticket, and a ticket price. The journey server 110 may comprise the schedule database 112, where the schedule database 112 stores schedule and travel service provider information for one or more travel segments. For example, the schedule database 112 may store a departure point, an arrival point, a departure time, and an arrival time for one or more travel segments. Furthermore, the schedule database 112 may also store scheduling rules that may limit the manner in which travel segments may be combined for a journey. The database 119 of the revenue management system 118 may store pricing rules, bid prices, and/or yields associated with the production travel inventory items of the inventory database 109 as well as historical production booking data.

Consistent with embodiments of the invention, the data processing system 100 includes one or more modules/engines that may be configured to perform operations generally associated with systems used in travel reservation booking and travel inventory management. In particular, the data processing system 100 includes a simulation engine 122, where the simulation engine 122 is configured to manage a simulation as will be described herein. The demand modeling/generation module 124 is configured to generate a demand model and a cancel model based at least in part on ticket records and generate simulated demand requests and simulated cancel requests based at least in part on the demand model and the cancel model.

The customer simulation module 126 is configured to simulate customer behavior. For each day of a simulation, the customer simulation module 126 simulates customer booking demand and cancel demand on reservation systems based at least in part on simulated demand requests and simulated cancel requests generated by the demand modeling/generation module 124. In particular, a booking/shopping flow for one or more travel solutions may be performed by the customer simulation module in communication with the distribution and reservation module 128. Based on booking/shopping responses from the distribution and reservation module 128, the customer simulation module 126 simulates booking decisions (i.e., selecting a travel solution for booking) The distribution and reservation module 128 is configured to simulate a reservation system such as a global distribution system. The distribution and reservation module 128 determines travel solutions for travel requests generated by the customer simulation module 126. The distribution and reservation module 128 may communicate with the inventory system 108 to determine and propose to the customer simulation module 126 available travel solutions with prices. Furthermore, the distribution and reservation module 128 interfaces with the customer simulation module 126 to perform bookings and cancellations. In addition, the distribution and reservation module 128 stores passenger booking records.

The fare quote module 130 is configured to determine and/or simulate available fares for travel inventory items with fare rules (e.g., advance purchase, Saturday night stay, minimum stay, cancellation fee, change fee, etc.). Therefore, the distribution and reservation module 128 may interface with the fare quote module 130 to determine pricing for available travel solutions based on availability and/or bid prices/yields received from the inventory system 108. The departure control module 132 is configured to simulate the functions of a departure control system such that no show passengers for a travel service and passengers that arrive without a booking/ticket may be simulated. In particular, the departure control module 132 computes for each departed travel service the resulting denied boarding passengers, which may be sent to the distribution and reservation module 128 and/or the inventory system 108. The reporting module 134 is configured to store data based on operations performed by the engines/modules 122-132. As will be appreciated, the reporting module may store simulation data for each day of a range of days for simulation; in addition, the reporting module may store simulation data for a first simulation and a second simulation, such that a comparison between the two simulations may be performed. For example, a user may configure the revenue management system 118 and/or the inventory system 108 with a first set of configuration rules for determining availability and bid prices/yield, and a simulation may be performed to generate first simulation data. The user may then configure the revenue management system 118 and/or the inventory system 108 with a second set of configuration rules for determining availability and bid prices/yield, and a simulation may be performed to generate second simulation data. Therefore, the configuration of the inventory system 108 and/or the revenue management system 118 based on the first set of configuration rules and the second set of configuration rules may be compared.

Figure 2:
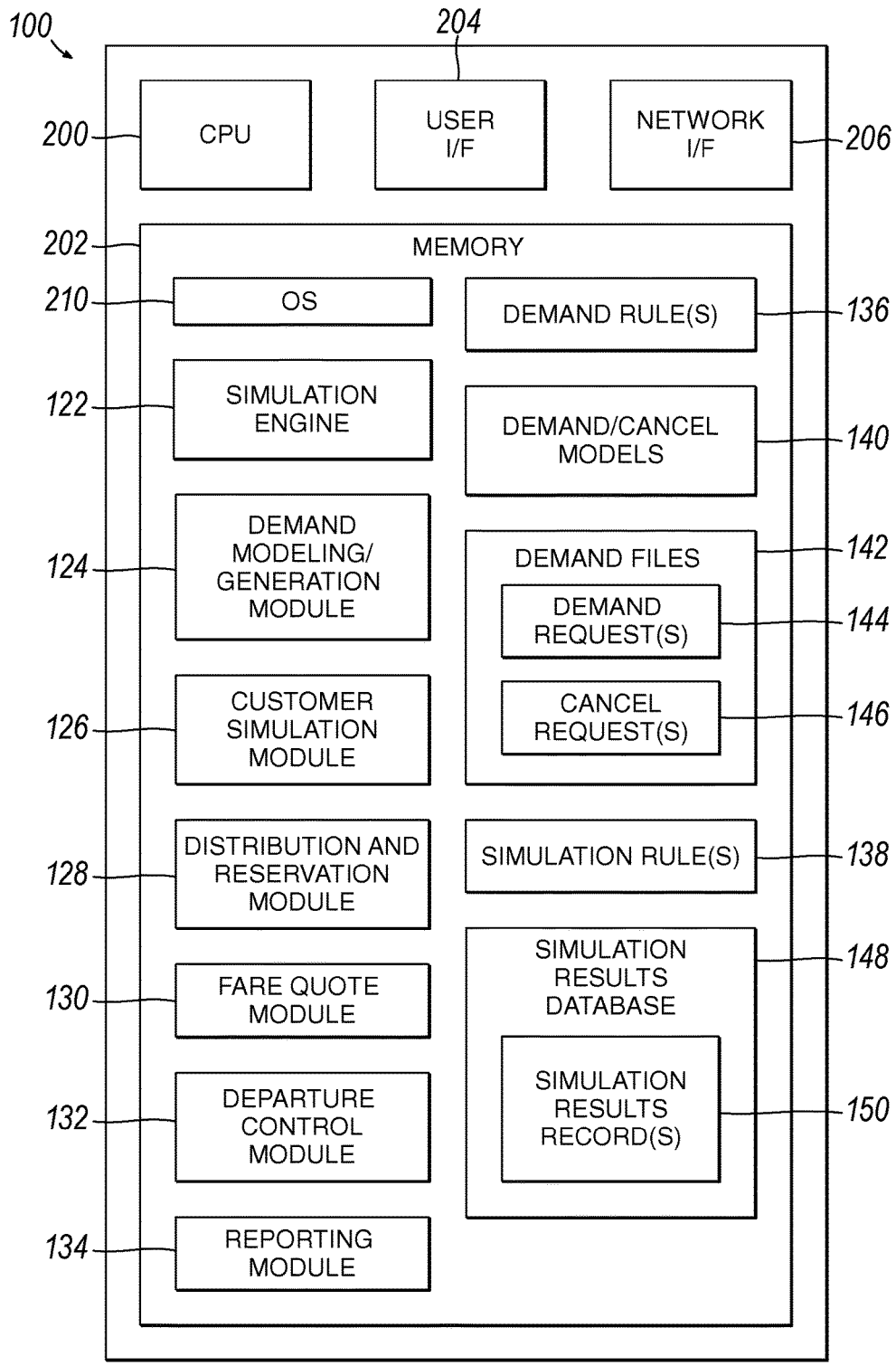
FIG. 2 is a block diagram of a data processing system of FIG. 1.

FIG. 2 provides a block diagram that illustrates the components of the data processing system 100. The data processing system 100 includes at least one processor (CPU) 200 including at least one hardware-based microprocessor and a memory 202 coupled to the at least one processor 200. The memory 202 may represent the random access memory (RAM) devices comprising the main storage of data processing system 100, as well as any supplemental levels of memory, e.g., cache memories, non-volatile or backup memories (e.g., programmable or flash memories), read-only memories, etc. In addition, memory 202 may be considered to include memory storage physically located elsewhere in the data processing system 100, e.g., any cache memory in a microprocessor, as well as any storage capacity used as a virtual memory, e.g., as stored on a mass storage device or on another computer coupled to the data processing system 100.

For interface with a user or operator, the data processing system 100 may include a user interface 204 incorporating one or more user input/output devices, e.g., a keyboard, a pointing device, a display, a printer, etc. Otherwise, data may be communicated to and from another computer or terminal (e.g., a client device 104, the inventory system 108, the ticket server 114, etc.) over a network interface 206 coupled to the communication network 120. The data processing system 100 also may be in communication with one or more mass storage devices, which may be, for example, internal hard disk storage devices, external hard disk storage devices, external databases, storage area network devices, etc.

The data processing system 100 typically operates under the control of an operating system 210 and executes or otherwise relies upon various computer software applications, components, programs, objects, modules, engines, data structures, etc., including for example, a simulation engine 122, a demand modeling/generation module 124, a customer simulation module 126, a distribution and reservation module 128, a fare quote module 130, a departure control module 132, and/or a reporting module 134. Furthermore, the memory 202 may store one or more configuration rules that may be used by the data processing system 100 in generating simulated demand requests and/or analyzing the management of travel inventory items by the inventory system 108 by performing one or more simulations. In particular, the memory may store demand rules 136 that may be used by the demand modeling/generation module 124 to generate a demand model, a cancel model, simulated demand requests, and/or simulated cancel requests. The memory may store simulation rules 138 that may be used by the simulation engine 122 during simulation of shopping/booking of travel inventory items managed by the travel inventory system 108. In addition, the memory 202 may store demand and/or cancel models 140 as well as demand files 142 comprising simulated demand requests 144 and/or simulated cancel requests 146 generated by the demand/modeling generation module 124. Moreover, the memory 202 may store a simulation results database 148 that stores simulation data in one or more simulation results records 150 for one or more simulations performed by the data processing system 100.

Figure 3:
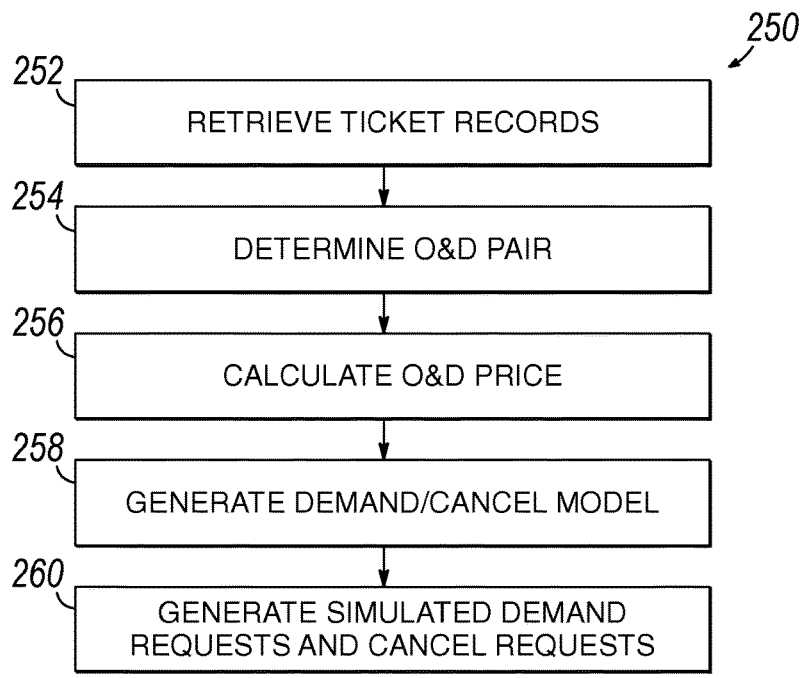
FIG. 3 is a flowchart illustrating a sequence of operations that may be performed by the data processing system of FIG. 1 to generate simulated demand requests and cancel requests.

Turning now to FIG. 3, this figure provides a flowchart 250 that illustrates a sequence of operations that may be performed by a data processing system 100 consistent with embodiments of the invention to generate simulated demand requests for analyzing travel inventory management by an inventory system 108. As shown, the data processing system 100 retrieves ticket records corresponding to ticketed travel inventory items for the inventory system 108 (block 252). In general, a ticket record comprises travel segments, passenger information, and/or a ticket price associated with ticketed travel inventory items for a passenger. In particular, for a passenger ticket upon which the ticket record is based, the ticket record includes a list of travel segments that may be combined for a journey represented by the passenger ticket. The data processing system 100 analyzes each ticket record to determine one or more origin and destination (O&D) pairs based on the travel segments included in the ticket record (block 254). For each O&D pair of each ticket record, the data processing system 100 calculates a price for the O&D pair based at least in part on the ticket price (block 256). In general, determining a price for an O&D pair may be based at least in part on the geographical distance between the origin and destination of the O&D pair.

Based on the determined O&D pairs and the price for each O&D pair, the data processing system generates a demand model and/or a cancel model (block 258). In general, generating the demand model and/or cancel model may comprise building one or more nodes for a tree model based at least in part on information stored in the ticket records. One or more types of nodes may be built for the demand model and/or cancel model, where the types of nodes may be further associated with other types of nodes in a tree model. Generally, the nodes may store data determined from the ticket records and/or statistics determined based on the data. Some nodes may store numerical values based on statistical distribution determined from data of the ticket records. Using the demand model, the data processing system 100 may generate one or more simulated demand requests, and using the cancel model, the data processing system 100 may generate one or more simulated cancel requests (block 260).

Figure 4:
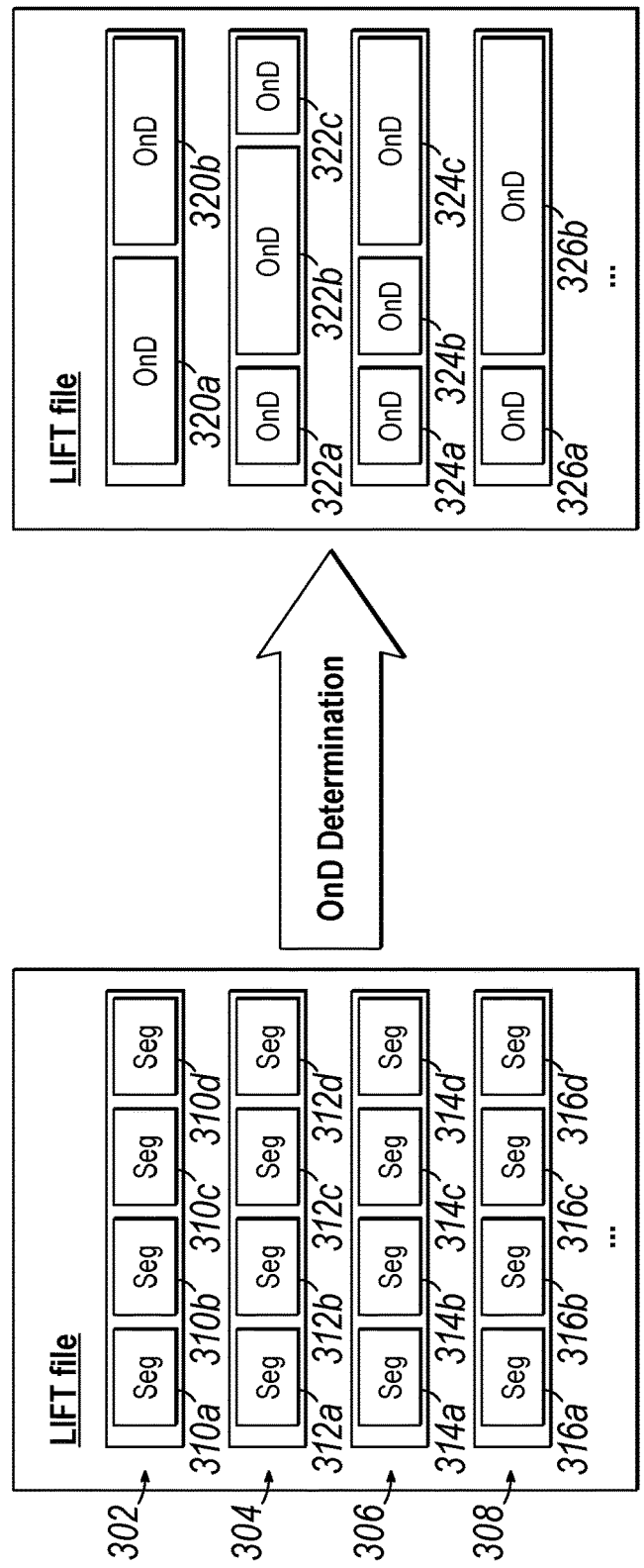
FIG. 4 is a diagrammatic illustration of an example determination of at least one origin and destination for ticket records based at least in part on travel segments of the ticket records.

FIG. 4 provides a diagrammatic illustration of example ticket records 302-308 that each comprises travel segments 310a-d, 312a-d, 314a-d, 316a-d. As shown, embodiments of the invention may analyze the travel segments 310a-d, 312a-d, 314a-d, 316a-d of each ticket record 302-308 to determine one or more O&D pairs 320a-b, 322a-c, 324a-c, 326a-b. In particular, a ticket record 302 may comprise travel segments 310a-d that may be determined to correspond to O&D pairs 320a-b; a ticket record 304 may comprise travel segments 312a-d that may be determined to correspond to O&D pairs 322a-c; a ticket record 306 may comprise travel segments 314a-d that may be determined to correspond to O&D pairs 324a-c; and a ticket record 308 may comprise travel segments 316a-d that may be determined to correspond to O&D pairs 326a-b.

Figure 5:
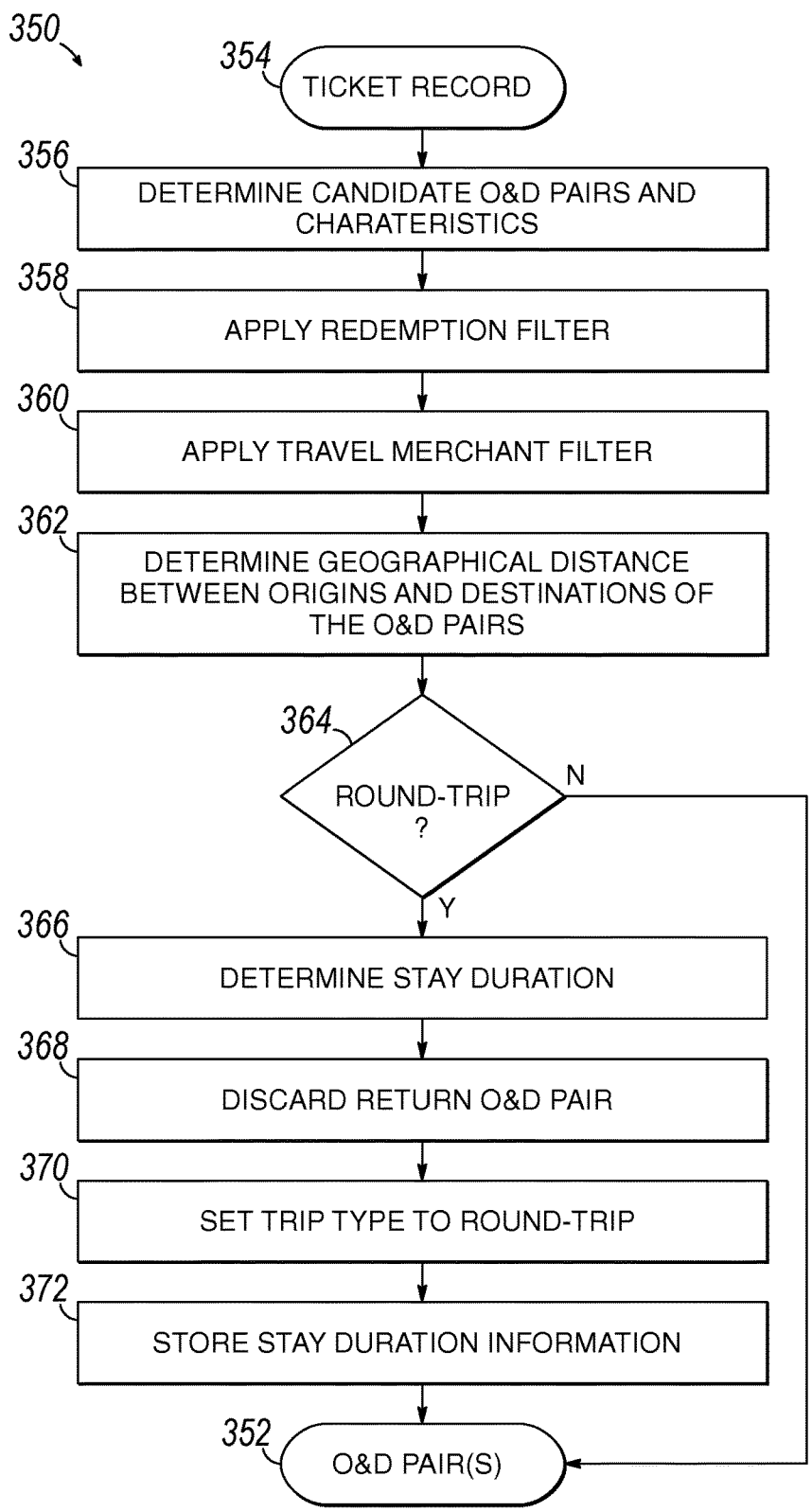
FIG. 5 is a flowchart illustrating a sequence of operations that may be performed by the data processing system of FIG. 1 to determine at least one origin and destination pairs for at ticket record.

FIG. 5 provides a flowchart 350 that illustrates a sequence of operations that may be performed by a data processing system 100 consistent with embodiments of the invention to determine one or more O&D pairs 352 for a ticket record consistent with embodiments of the invention. The data processing system 100 determines one or more candidate O&D pairs for the ticket record (block 356) and characteristics for the O&D pair based on travel segments of the O&D pair. In general, a ticket record may include a stopover code that indicates whether a stop between two travel segments for a connection. Therefore, the data processing system 100 may analyze the stopover codes for travel segments to determine whether travel segments correspond to a common O&D pair or whether travel segments correspond to different O&D pairs. Characteristics for each O&D pair generally comprise an origin for the O&D pair, a destination for the O&D pair, and/or a booking class for the O&D pair. The origin of the O&D pair corresponds to a departure point of a first travel segment of the O&D pair. The destination of the O&D pair corresponds to an arrival point of a last travel segment of the O&D pair. The booking class of the O&D pair corresponds to a booking class of the first travel segment of the O&D pair.

The data processing system 100 may apply a redemption filter on the candidate O&D pairs to discard one or more candidate O&D pairs (block 358). In general, one or more demand rules may be defined by a user to thereby define a redemption filter. For example, candidate O&D pairs having a particular booking class may be discarded by the data processing system 100 applying the redemption filter. Furthermore, the data processing system 100 may filter the candidate O&D pairs based at least in part on travel merchants associated with the travel segments of the candidate O&D pair (block 360). As discussed, embodiments of the invention may be configured to evaluate travel inventory item management by an inventory system of a travel merchant. However, the ticket records stored in the ticket server may correspond to more than one travel merchant. Therefore, embodiments of the invention may filter candidate O&D pairs to discard any candidate O&D pairs that do not include at least one travel segment operated by the travel merchant for which analysis is being performed.

As will be appreciated, some ticket records may include a round-trip itinerary—i.e., a first O&D pair may correspond to an outbound trip and a second O&D pair may correspond to an inbound trip. Embodiments of the invention may be configured to determine candidate O&D pairs that correspond to a round-trip itinerary. For ticket records having more than one candidate O&D pair, the data processing system 100 may determine a first geographical distance between an origin of a first candidate O&D pair and a destination of a second candidate O&D pair, and the data processing system 100 may determine a second geographical distance between a destination of the first candidate O&D pair and the origin of the second candidate O&D pair (block 362). Based at least in part on the first geographical distance and the second geographical distance, the data processing system 100 determines whether any candidate O&D pairs of the ticket record correspond to a round-trip itinerary (block 364). Generally, candidate O&D pairs may be determined to correspond to round-trip travel if the first geographical distance and the second geographical distance are within a predefined range. For example, a demand rule may indicate that O&D pairs correspond to round-trip travel if the first geographical distance and the second geographical distance are under 200 kilometers. If the ticket record does not include more than one candidate O&D pair or if the first geographical distance and second geographical distance do not indicate that candidate O&D pairs correspond to round-trip travel ("N" branch of block 364), the candidate O&D pairs, after the application of the one or more filters (blocks 358-360), are determined to be O&D pairs (352) for the ticket record.

In response to determining that candidate O&D pairs of the ticket record correspond to round-trip travel ("Y" branch of block 364), the data processing system 100 determines a stay duration for the round-trip travel (block 366). In general, the stay duration is determined based at least in part on an arrival time of a last travel segment of the first candidate O&D pair (i.e., the outbound trip) and the departure time of a first travel segment of the second candidate O&D pair (i.e., the inbound trip). The data processing system 100 discards the candidate O&D pair of the round-trip travel corresponding to the inbound trip (block 368), and the data processing system 100 stores an indicator for the candidate O&D pair corresponding to the outbound trip that indicates that the candidate O&D pair corresponds to round-trip travel. The data processing system 100 stores the stay duration for the outbound trip candidate O&D pair. After application of the one or more filters (blocks 358-360) and discarding candidate O&D pairs corresponding to inbound trips of round-trip travel (block 368), the remaining candidate O&D pairs are determined to be the O&D pairs 352 for the travel record.

Figure 6:
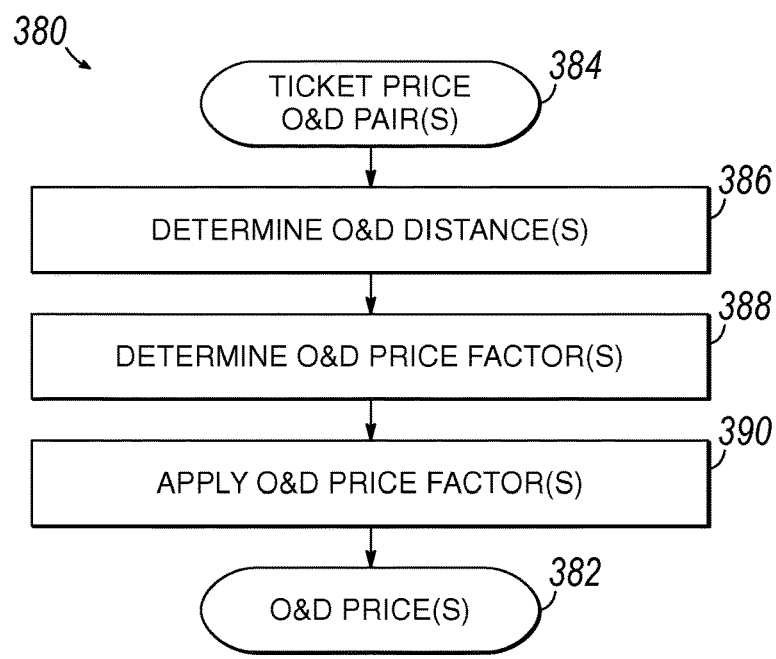
FIG. 6 is a flowchart illustrating a sequence of operations that may be performed by the data processing system of FIG. 1 to determine origin and destination prices.

FIG. 6 provides a flowchart 380 that illustrates a sequence of operations that may be performed by a data processing system 100 consistent with embodiments of the invention to determine an O&D price 382 for O&D pairs of a ticket record based on the O&D pairs and the ticket price 384. For each O&D pair of the ticket record, the data processing system 100 determines a geographical distance between the origin and the destination of each O&D pair of the ticket record (block 386). For each O&D pair, an O&D price factor is determined based at least in part on the geographical distance (block 388). In general, the O&D price factors for all O&D pairs of the ticket record sum to 1. Therefore, the O&D price factor for each O&D pair is weighted based at least in part on the geographical distance of the O&D pair. In some embodiments, the O&D price factor for an O&D pair may be proportional to a square root of the geographical distance determined for the O&D pair. The O&D price factor of each O&D pair is applied to the ticket price (block 390) to determine the O&D price for the O&D pair. In some embodiments, each O&D price may be calculated based on the following equation:

$$\text{Price}_{O\&D} = \text{Price Factor}_{O\&D} * \text{Ticket Price}. \quad (1)$$

Figure 7A:
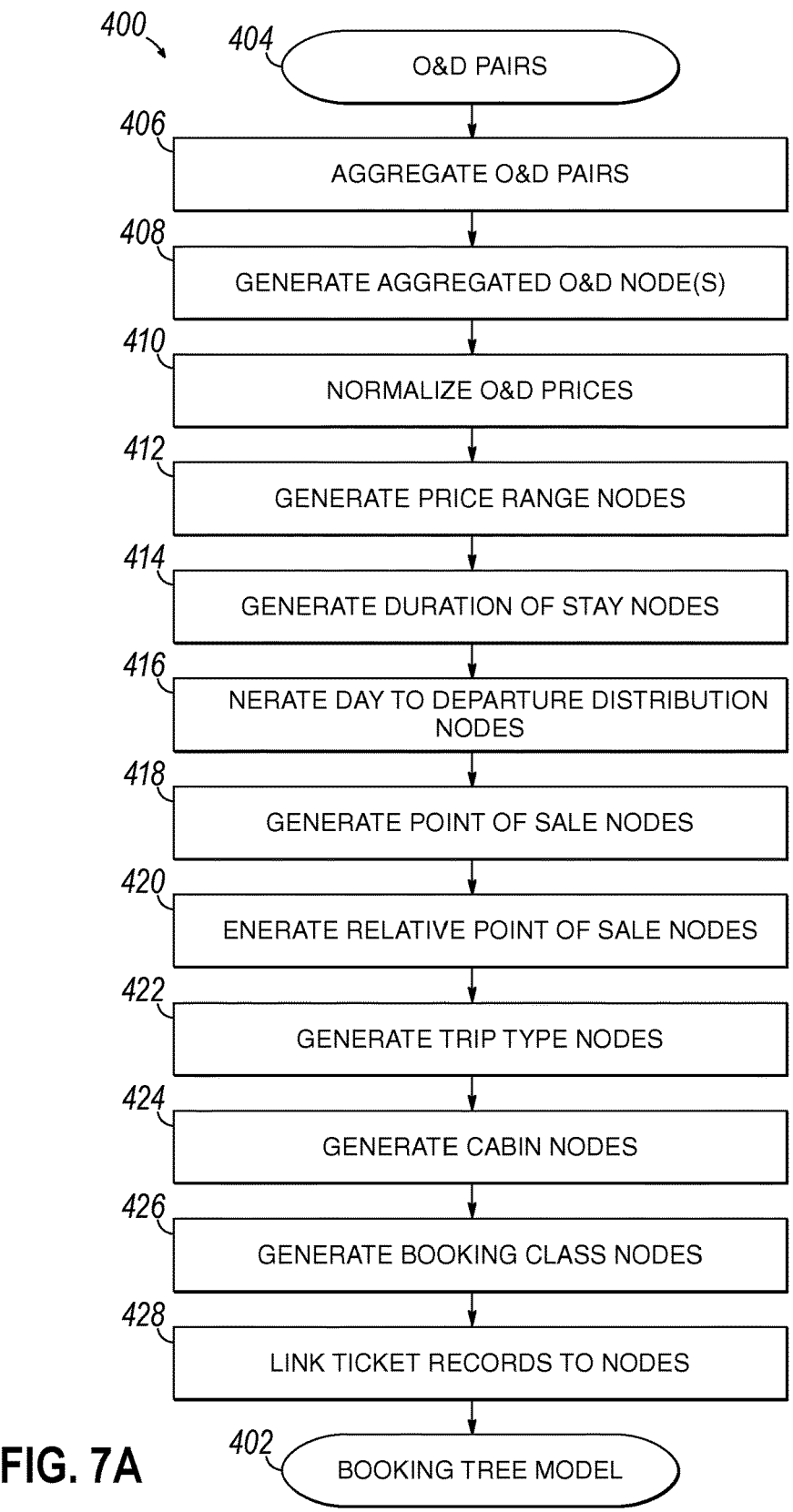
FIG. 7A is a flowchart illustrating a sequence of operations that may be performed by the data processing system of FIG. 1 to generate a booking tree model.

FIG. 7A provides a flowchart 400 that illustrates a sequence of operations that may be performed by a data processing system 100 consistent with embodiments of the invention to generate a booking tree model 402 based at least in part on the determined O&D pairs 404. The data processing system 100 may aggregate the O&D pairs to thereby determine aggregated O&D pairs (block 406). As will be appreciated, the ticket records are based on tickets generated for passengers and therefore ticketed travel inventory items. In some cases, a particular O&D pair determined from the ticket records may have a large number of associated ticket records (e.g., a relatively high number of passengers booked travel inventory items for the O&D pair), while other O&D pairs determined from the ticket records may not have many associated ticket records (e.g., a relatively low number of passengers booked travel inventory items for the O&D pair). Therefore, embodiments of the invention may aggregate O&D pairs having a relatively low number of associated ticket records with a proximate O&D pair having a relatively high number of associated ticket records. One or more demand rules may define a relevance threshold such that a defined number of ticket records (and therefore bookings) must be associated with an O&D pair for the O&D pair to be relevant, where a relevant O&D pair may serve as an aggregated O&D pair and may not be aggregated to another O&D pair. For example, a demand rule may indicate that at least 100 ticket records are required for an O&D pair to be relevant. Furthermore, an aggregated O&D pair for which an O&D pair should be associated may be determined based at least in part on a geographical distance between an origin of an O&D pair and an origin of an aggregated O&D pair and a geographical distance between a destination of the O&D pair and the destination of the aggregated O&D pair.

Based on the determined aggregated O&D pairs, the data processing system generates aggregated O&D nodes (block 408), where the O&D pairs are associated with the aggregated O&D nodes. The data processing system 100 normalizes the O&D price determined for each O&D pair of each ticket record associated with each aggregated O&D pair node (block 410). For each ticket record, a normalized O&D price is determined for each O&D price of each O&D segment based at least in part on the geographical distance of the O&D pair. In some embodiments, the normalized O&D price for each O&D pair of each ticket record may be determined based at least in part on the following equation:

$$\text{Normalized Price}_{O\&D} = \frac{\text{Price}_{O\&D}}{\sqrt{\text{distance}_{O\&D}}}. \quad (2)$$

Based on the normalized O&D prices, the data processing system 100 generates price range nodes (block 412). In general, for each aggregated O&D node, the data processing system 100 generates price range nodes to which normalized O&D prices and the associated ticket record may be associated. In some embodiments of the invention, each price range node is generated such that 20% of the normalized O&D prices associated with an aggregated O&D pair are associated with each price range node. Hence, in some embodiments, each aggregated O&D node is associated with five price range nodes. For all ticket records associated with O&D pairs determined to be associated with the aggregated O&D pair, the data processing system analyzes the normalized O&D price for the O&D pairs. Each ticket record is thereby associated with a particular price range node based on the normalized O&D price determined for the ticket record.

The data processing system 100 may generate one or more other types of nodes for the booking tree model based at least in part on the ticket records and/or aggregated O&D pairs. In particular, the data processing system 100 may generate one or more duration of stay nodes associated with each aggregated O&D node that may store a statistical distribution of durations of stay associated with the aggregated O&D node (block 414). For example, the data processing system may store a duration of stay node comprising a bar statistical distribution associated with an aggregated O&D node that indicates duration of stays determined from ticket records associated with the aggregated O&D node. The data processing system 100 may generate a day to departure distribution node for each aggregated O&D node (block 416). The day to departure distribution node may store a bar statistical distribution that indicates how many days prior to departure booking occurred for the associated ticket records.

Furthermore, the data processing system 100 may generate point of sale nodes for the aggregated O&D nodes based at least in part on the point of sale of each associated ticket record (block 418). In addition, the data processing system 100 may generate relative point of sale nodes for each aggregated O&D node (block 420) that indicates: (1) associated ticket records having a point of sale associated with the origin of the associated O&D pair; (2) associated ticket records having a point of sale associated with the destination of the associated O&D pair; and (3) associated ticket records having a point of sale other than the origin or destination of the associated O&D pair. A trip type node may be generated for each aggregated O&D node (block 422) that indicates ticket records determined to have a one-way associated O&D pair and ticket records having a round-trip associated O&D pair. The data processing system 100 may generate a cabin node for each aggregated O&D node (block 424) that indicates a cabin determined for each associated O&D pair of each associated ticket record in a statistical distribution. Similarly, the data processing system 100 may generate a booking class node for each aggregated O&D node (block 426) that indicates the determined booking class for the associated O&D pair of each associated ticket record in a statistical distribution (block 426).

Furthermore, the nodes of the booking tree model may be linked to associated ticket records (block 428) using booking data determined from each ticket record. For example, each aggregated O&D node may be linked to each ticket record having an O&D pair associated with the aggregated O&D node. As a further example, a ticket record having an O&D pair associated with a first aggregated O&D node and a point of sale of city A may be linked to a point of sale node for city A associated with the first aggregated O&D node.

After generation of the one or more nodes associated with the aggregated O&D nodes, the data processing system 100 has generated the booking tree model 402. In some embodiments, the data processing system 100 may organize the nodes of the booking tree model such that seasonality may be considered. For example, a booking date of ticket records as well as a departure date for each O&D pair of each ticket record may be used to generate a week of the year node for each aggregated O&D node that stores a statistical distribution of associated ticket records for the weeks of a year. Furthermore, a day of the week node may be generated that stores statistical information determined from associated ticket records for each day of the week. In seasonality-based booking tree models, booking distribution data may be stored based at least in part on a determined date in bar distribution statistical form. In non-seasonality-based booking tree models, booking distribution data may be stored in a normal statistical distribution form.

As will be appreciated, nodes of the booking tree model may be linked to a set of booking data. In general, for each ticket record, a corresponding set of booking data is determined and stored. For each node that includes information based on a particular ticket record, the node is linked to the set of booking data that corresponds to the ticket record. For example, if a ticket record includes a point of sale of Vienna, Austria (VIE), the booking data corresponding to the ticket record will be linked to a point of sale node representing the point of sale of VIE. As will be appreciated, each set of booking data is generally linked to more than one node, where each linked node includes information that is based on a ticket record corresponding to the set of booking data.

FIG. 7B provides an example table 430 that describes a data structure of each node 432. Each node 432 includes information based on the retrieved records, where such information includes a number of bookings (i.e., ticket records) 434 associated with the node, a sum of price 436, and a link to sets of booking data 438 associated with the node. In general, each booking data 438 may include a booking weight 440 and a fare weight 442 that indicates a weight of each set of booking data on the information of the node 432.

Figure 8:
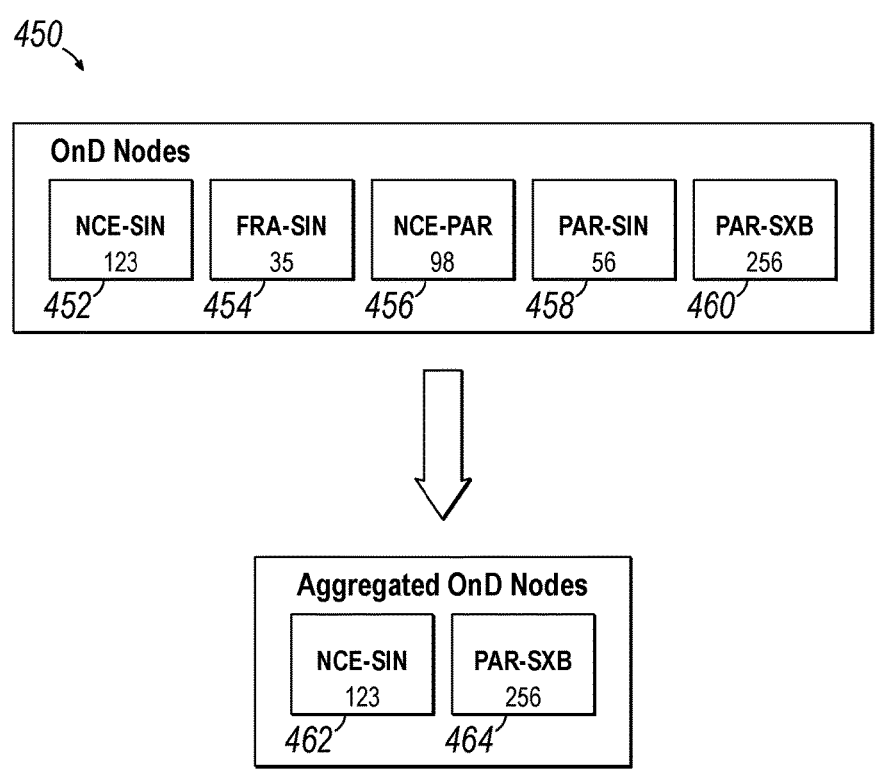
FIG. 8 provides a diagrammatic illustration of a determination of aggregated origin and destination nodes.

FIG. 8 provides a diagrammatic illustration of an example processing 450 of O&D nodes 452-460 associated with O&D pairs determined from ticket records to determine aggregated O&D nodes 462-464. As shown in the example, an O&D node 452 corresponds to the O&D pair 'NCE-SIN', where 123 ticket records were determined to correspond to the O&D pair; an O&D node 454 corresponds to the O&D pair 'FRA-SIN', where 35 ticket records were determined to correspond to the O&D pair; an O&D node 456 corresponds to the O&D pair 'NCE-PAR', where 98 ticket records were determined to correspond to the O&D pair; an O&D node 458 corresponds to the O&D pair 'PAR-SIN', where 56 ticket records were determined to correspond to the O&D pair; and an O&D node 460 corresponds to the O&D pair 'PAR-SXB', where 256 ticket records were determined to correspond to the O&D pair. In this example, O&D nodes 452-460 may be grouped into the aggregated O&D nodes 462-464 based on the number of ticket records corresponding to each O&D node 452-460. In this example, O&D nodes 452-460 having less than 100 corresponding ticket records may be aggregated into an aggregated O&D node based at least in part on geographical distance between the origin and destination of the O&D pair and the aggregated O&D pair of the aggregated O&D node. In this example, the O&D node 454, the O&D node 456, and the O&D node 458 may be aggregated into the O&D node 452 or the O&D node 460 to thereby determine the aggregated O&D nodes 462-464. In general, a number of ticket records (i.e., bookings) associated with an O&D pair represented by an O&D node and/or associated with an aggregated O&D pair represented by an aggregated O&D node may be stored at a node, where such number may be referred to as a booking counter. For example, the booking counter for the O&D node (i.e., 'NCE-SIN') 452 indicates that 123 bookings were completed for the O&D pair 'NCE-SIN'.

Figures 9A, 9B:
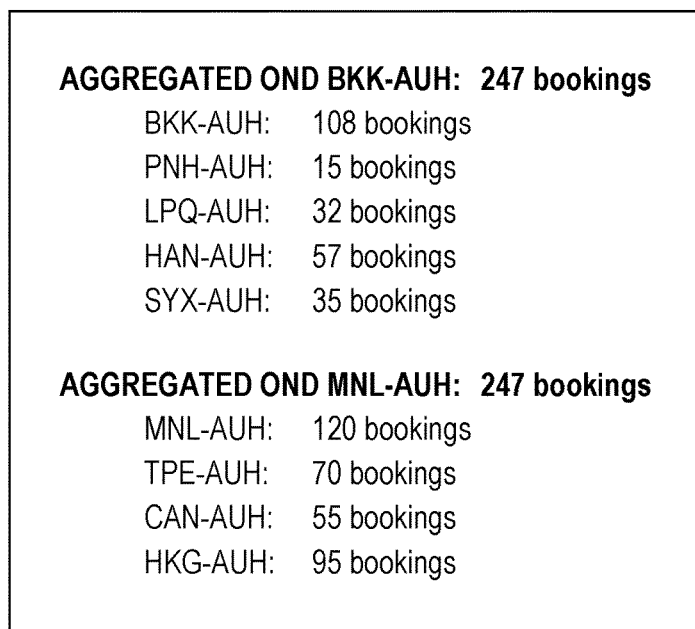
FIGS. 9A-B illustrate an example determination of aggregated origin and destination nodes.

FIGS. 9A-B provide an example that illustrates O&D pair aggregation that may be performed by the data processing system consistent with embodiments of the invention. In FIG. 9A, the geographical distance between origins and destinations of an O&D pair and possible aggregated O&D pairs is illustrated. In particular, two possible aggregated O&D pairs (i.e., 'MNL-AUG' 482 and 'BKK-AUH' 484) are analyzed for seven O&D pairs (i.e., 'PHN-AUH' 486, 'LPQ-AUH' 488, 'HAN-AUH' 490, 'SYX-AUH' 492, 'TPE-AUH' 494, 'CAN-AUH' 496, and 'HKG-AUH' 498) based on geographical distance between the origins and the destinations. As shown, for the O&D pair 'PNH-AUH' 486 and the possible aggregated O&D pair 'MNL-AUH' 482, the geographical distance between the origin of the O&D pair (i.e., 'PNH') and the origin of the possible aggregated O&D pair (i.e., 'MNL') is 1780 km and the geographical distance between the destination of the O&D pair (i.e., 'AUH') and the destination of the possible aggregated O&D pair (i.e., 'AUH') is 0 km. Similarly, for the O&D pair 'PNH-AUH' 486 and the possible aggregated O&D pair 'BKK-AUH' 484, the geographical distance between the origins (i.e., 'PNH' and 'BKK') is 504 km, and the geographical distance between the destinations (i.e., 'AUH' and 'AUH') is 0 km. Therefore, as shown in the example chart 500 shown in FIG. 9B, the O&D pair 'PNH-AUH' 486 may be aggregated into the aggregated O&D pair 'BKK-AUH' 484 because the geographical distance between the origins and destinations is minimized.

For the O&D pair 'IPQ-AUH' 488 and the possible aggregated O&D pair 'MNL-AUH' 482, the geographical distance between the origins (i.e., 'LPQ' and 'MNL) is 2088 km, and the geographical distance between the destinations (i.e., 'AUH' and 'AUH') is 0 km. For the O&D pair IPQ-AUH' 488 and the possible aggregated O&D pair 'BKK-AUH' 484, the geographical distance between the origins (i.e., 'LPQ' and 'BKK') is 707 km, and the geographical distance between the destinations (i.e., 'AUH' and 'AUH') is 0 km. Therefore, as shown in the example chart 500 in FIG. 9B, the O&D pair 'IPQ-AUH' 488 may be aggregated into the aggregated O&D pair 'BKK-AUH' 484 because the geographical distance between the origins and destinations is minimized.

For the O&D pair 'HAN-AUH' 490 and the possible aggregated O&D pair 'MNL-AUH' 482, the geographical distance between the origins (i.e., 'HAN' and 'MNL') is 1771 km, and the geographical distance between the destinations (i.e., 'AUH' and 'AUH') is 0 km. For the O&D pair 'HAN-AUH' 490 and the possible aggregated O&D pair 'BKK-AUH' 484, the geographical distance between the origins (i.e., 'HAN' and 'BKK') is 995 km, and the geographical distance between the destinations (i.e., 'AUH' and 'AUH') is 0 km. Therefore, as shown in the example chart 500 in FIG. 9B, the O&D pair 'HAN-AUH' 490 may be aggregated into the aggregated O&D pair 'BKK-AUH' 484 because the geographical distance between the origins and destinations is minimized.

For the O&D pair 'SYX-AUH' 492 and the possible aggregated O&D pair 'MNL-AUH' 482, the geographical distance between the origins (i.e., 'SYX' and 'MNL') is 1306 km, and the geographical distance between the destinations (i.e., 'AUH' and 'AUH') is 0 km. For the O&D pair 'SYX-AUH' 492 and the possible aggregated O&D pair 'BKK-AUH' 484, the geographical distance between the origins (i.e., 'SYX' and 'BKK') is 1058 km, and the geographical distance between the destinations (i.e., 'AUH' and 'AUH') is 0 km. Therefore, as shown in the example chart 500 in FIG. 9B, the O&D pair 'SYX-AUH' 492 may be aggregated into the aggregated O&D pair 'BKK-AUH' 484 because the geographical distance between the origins and destinations is minimized.

For the O&D pair 'TPE-AUH' 494 and the possible aggregated O&D pair 'MNL-AUH' 482, the geographical distance between the origins (i.e., 'TPE' and 'MNL') is 1174 km, and the geographical distance between the destinations (i.e., 'AUH' and 'AUH') is 0 km. For the O&D pair 'TPE-AUH' 494 and the possible aggregated O&D pair 'BKK-AUH' 484, the geographical distance between the origins (i.e., 'TPE' and 'BKK') is 2487 km, and the geographical distance between the destinations (i.e., 'AUH' and 'AUH') is 0 km. Therefore, as shown in the example chart 500 in FIG. 9B, the O&D pair 'TPE-AUH' 494 may be aggregated into the aggregated O&D pair 'MNL-AUH' 484 because the geographical distance between the origins and destinations is minimized.

For the O&D pair 'CAN-AUH' 496 and the possible aggregated O&D pair 'MNL-AUH' 482, the geographical distance between the origins (i.e., 'CAN' and 'MNL') is 1276 km, and the geographical distance between the destinations (i.e., 'AUH' and 'AUH') is 0 km. For the O&D pair 'CAN-AUH' 496 and the possible aggregated O&D pair 'BKK-AUH' 484, the geographical distance between the origins (i.e., 'CAN' and 'BKK') is 1276 km, and the geographical distance between the destinations (i.e., 'AUH' and 'AUH') is 0 km. Therefore, as shown in the example chart 500 in FIG. 9B, the O&D pair 'CAN-AUH' 496 may be aggregated into the aggregated O&D pair 'MNL-AUH' 484 because the geographical distance between the origins and destinations is minimized.

For the O&D pair 'HKG-AUH' 498 and the possible aggregated O&D pair 'MNL-AUH' 482, the geographical distance between the origins (i.e., 'HKG' and 'MNL') is 1144 km, and the geographical distance between the destinations (i.e., 'AUH' and 'AUH') is 0 km. For the O&D pair 'HKG-AUH' 498 and the possible aggregated O&D pair 'BKK-AUH' 484, the geographical distance between the origins (i.e., 'CAN' and 'BKK') is 1688 km, and the geographical distance between the destinations (i.e., 'AUH' and 'AUH') is 0 km. Therefore, as shown in the example chart 500 in FIG. 9B, the O&D pair 'CAN-AUH' 496 may be aggregated into the aggregated O&D pair 'MNL-AUH' 484 because the geographical distance between the origins and destinations is minimized.

As will be noted in the example chart 500 provided in FIG. 9B, the ticket records (i.e., bookings) associated with each O&D pair 486-498 may be added into the total booking count for the aggregated O&D pair into which the O&D pair 486-498 is aggregated. Therefore, as illustrated by this example, O&D pairs associated with smaller markets (i.e., fewer bookings and therefore fewer ticket records) may be aggregated into nearby larger market O&D pairs. By aggregating the smaller market O&D pairs into the larger market O&D pairs, embodiments of the invention may sort booking data of ticket records into large market O&D pairs for analysis thereof.

Figures 10A, 10B:
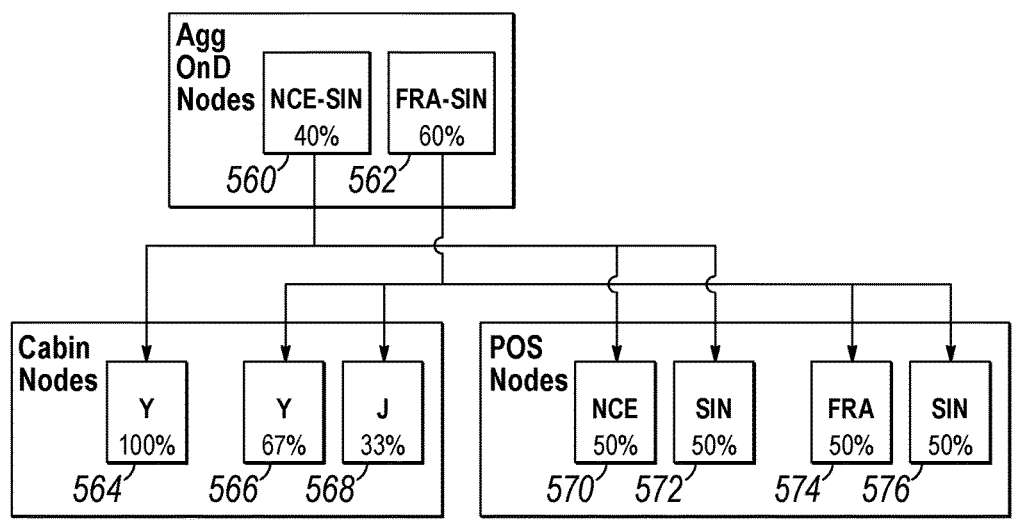
FIGS. 10A-B illustrate an example generation of one or more nodes of a booking tree model and/or demand model.

FIGS. 10A-B illustrate an example generation of nodes for a booking tree model and/or demand model consistent with embodiments of the invention based on booking data from ticket records. As shown, in FIG. 10A booking data 550 from ticket records indicates a cabin 552 and point of sale 554 for ticket records associated with an aggregated O&D pair 556 (in this example, either 'NCE-SIN' or 'FRA-SIN'). The booking data may be used to generate aggregated O&D nodes 560, 562 corresponding to the aggregated O&D pairs. In this example, each aggregated O&D node 560, 562 includes statistical data that indicates a percentage of ticket records corresponding to the aggregated O&D node 560, 562—i.e., the 'NCE-SIN' node 560 corresponds to 40% of the ticket records and the 'FRA-SIN' node 562 corresponds to 60% of the ticket records.

As shown, cabin nodes 564-568 may be generated based at least in part on the booking data, where one or more cabin nodes 564-568 may be associated with an aggregated O&D node 560, 562. In this example, and based on the booking data 550 of the ticket records, the aggregated O&D node 'NCE-SIN' 560 is associated with a cabin node 564 associated with the cabin class 'Y' that indicates that 100% of bookings (i.e., ticket records) associated with the aggregated O&D 'NCE-SIN' were booked for cabin class 'Y'. Similarly, the aggregated O&D node 'FRA-SIN' 562 is associated with two cabin nodes 566, 568—a first cabin node 566 associated with the cabin class 'Y' that indicates that 67% of bookings (i.e., ticket records) associated with the aggregated O&D 'FRA-SIN' were booked for cabin class 'Y'; and a second cabin node 568 associated with the cabin class T that indicates that 33% of bookings (i.e., ticket records) associated with the aggregated O&D 'FRA-SIN' were booked for cabin class T.

Furthermore, the aggregated O&D nodes 560, 562 are associated with point of sale nodes 570-576. In this example, based on the booking data 550 of the ticket records, the aggregated O&D node 'NCE-SIN' 560 is associated with two point of sale nodes 570, 572—a first point of sale node 570 associated with the point of sale of 'NCE' that indicates that 50% of bookings (i.e., ticket records) for the aggregated O&D 'NCE-SIN' have a point of sale of 'NCE'; and a second point of sale node 572 associated with the point of sale of 'SIN' that indicates that 50% of bookings (i.e., ticket records) for the aggregated O&D 'NCE-SIN' have a point of sale of 'SIN'. The aggregated O&D node 'FRA-SIN' 562 is associated with two point of sale nodes 574, 576—a third point of sale node 574 associated with the point of sale of 'FRA' that indicates that 67% of bookings (i.e., ticket records) for the aggregated O&D 'FRA-SIN' have a point of sale of 'FRA'; and a fourth point of sale node 576 associated with the point of sale of 'SIN' that indicates that 33% of bookings (i.e., ticket records) for the aggregated O&D 'FRA-SIN' have a point of sale of 'SIN'.

Figure 11:
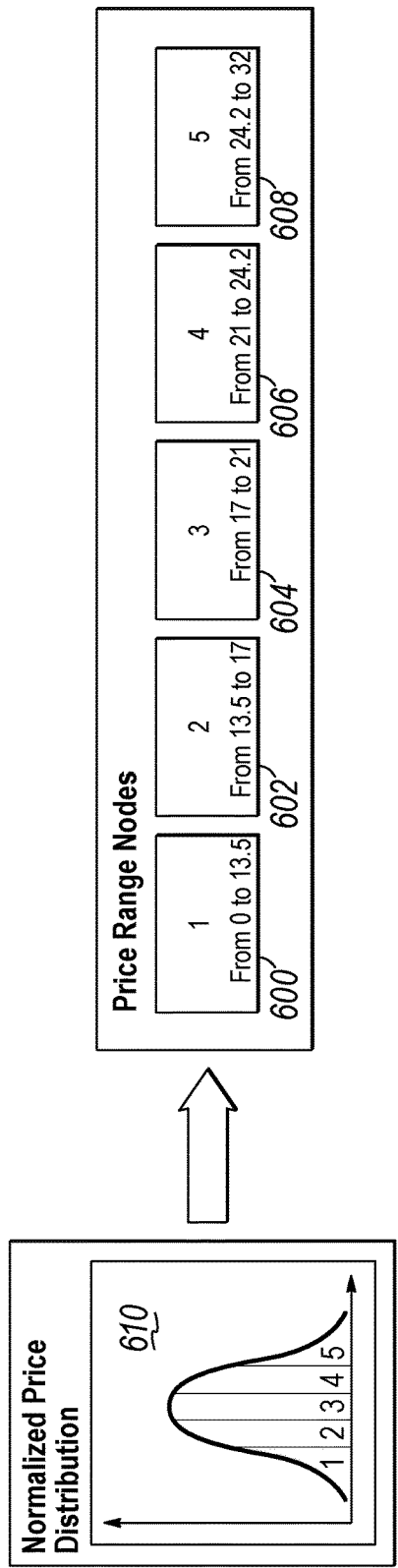
FIG. 11 is an example illustration of price range nodes that may be generated for a demand model and/or booking tree model.

FIG. 11 illustrates example price range nodes 600-608 that may be generated for an aggregated O&D node consistent with embodiments of the invention. In general, the data processing system may analyze the O&D price of each O&D pair for a ticket record associated with the aggregated O&D pair of the aggregated O&D node. The data processing system may generate a normalized price distribution 610 based on the O&D prices. Based on the normalized price distribution, the data processing system may generate price range nodes that each comprise 20% of normalized prices for the aggregated O&D of the aggregated O&D node.

Figure 12:
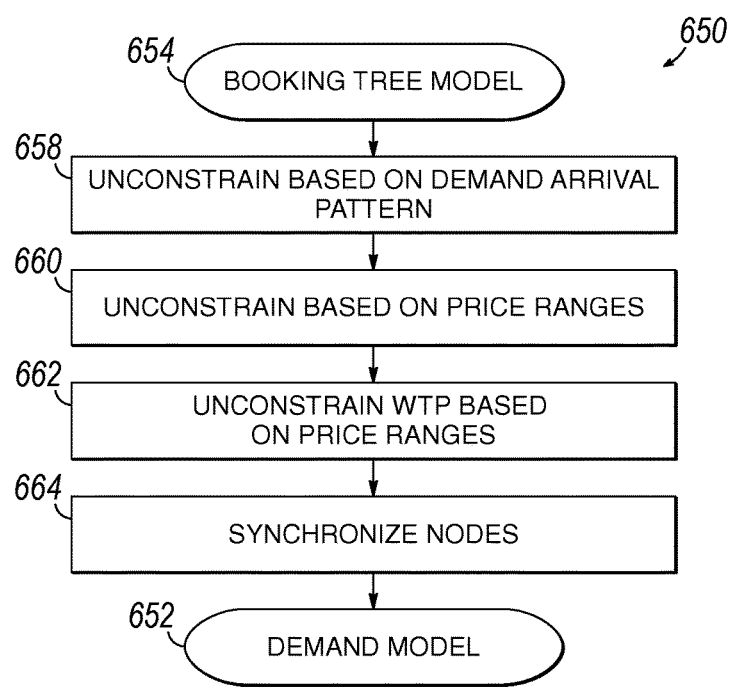
FIG. 12 is a flowchart illustrating a sequence of operations that may be performed by the data processing system of FIG. 1 to unconstrain a booking tree model to generate a demand model.

Turning to FIG. 12, this figure provides a flowchart 650 that illustrates a sequence of operations that may be performed by a data processing system 100 consistent with embodiments of the invention to generate a demand model 652 based on a booking tree model 654. Generally, a booking tree model is based on ticket records—i.e., completed bookings Therefore, the booking tree model is generally a reflection of bookings for a particular travel merchant. However, because the ticket records are only based on completed bookings the booking tree model may not accurately reflect demand for travel inventory items. For example, potential customers that could not purchase a ticket for a flight because the flight was totally booked are not within the scope of the booking tree model. Therefore, embodiments of the invention may determine a demand model based on the booking tree model, where the demand model unconstrains the booking tree model to account for demand.

As shown in FIG. 12, the data processing system 100 unconstrains the booking tree model based on demand arrival pattern (block 658). For each day to departure node of the booking tree model, a maximum number of bookings per day may be determined, and unconstraining may comprise setting demand as a constant curve starting from a point where the maximum is reached. In general, unconstraining based on the maximum number of bookings per day may facilitate modeling demand because demand may not decrease when a travel service is close to a departure date. In other words, bookings may decrease as the days to departure decreases due to availability, not demand. Therefore, embodiments of the invention unconstrain the number of bookings to reflect demand instead of actual bookings Consistent with embodiments of the invention, unconstraining the booking tree model may comprise adjusting booking counters and/or statistical data stored at the nodes. After unconstraining one or more nodes of the booking tree model, the data processing system may realign any unconstrained nodes with associated nodes—i.e., by adjusting associated nodes to reflect the same data as an unconstrained node.

The data processing system unconstrains one or more nodes of the booking tree model based at least in part on price ranges (block 660). Consistent with embodiments of the invention, a multiplicative factor may be applied to booking counters to determine a demand counter. The multiplicative factors generally reflect a higher demand for lower priced bookings for a travel service. Therefore, a booking counter may be transformed to a demand counter. After such unconstraining by transforming a booking counter of one or more nodes to a demand counter, embodiments of the invention may realign associated nodes to reflect the unconstraining of the booking counter. In general, unconstraining based on price ranges may cause a booking counter of a lower priced booking class node and/or cabin class node to increase when adjusted to a demand counter.

The data processing system 100 unconstrains one or more nodes of the booking tree model based at least in part on willingness-to-pay (block 662). In general, a multiplicative factor may be determined and applied to prices of the normalized price range nodes. Embodiments of the invention that implement unconstraining based on willingness-to-pay address demand issues due to price sensitivity, particularly with regard to low priced demand (e.g., travelers interested in low cost fares, low cost classes). After unconstraining based on willingness-to-pay, embodiments of the invention may realign associated nodes to reflect unconstraining of the price range nodes. Therefore, after each unconstraining and realignment, the data processing system may synchronize the nodes of the booking tree model (block 664). As will be appreciated, the synchronization may be performed after each unconstraining. In general, synchronization/realignment aligns the data of each node of the booking tree model in response to unconstraining of some of the nodes based on linked booking data. For example, unconstraining a willingness-to-pay of some nodes may cause data of other nodes to change. The unconstraining and synchronization of the nodes transforms the booking tree model into the demand model 652.

Figure 13A:
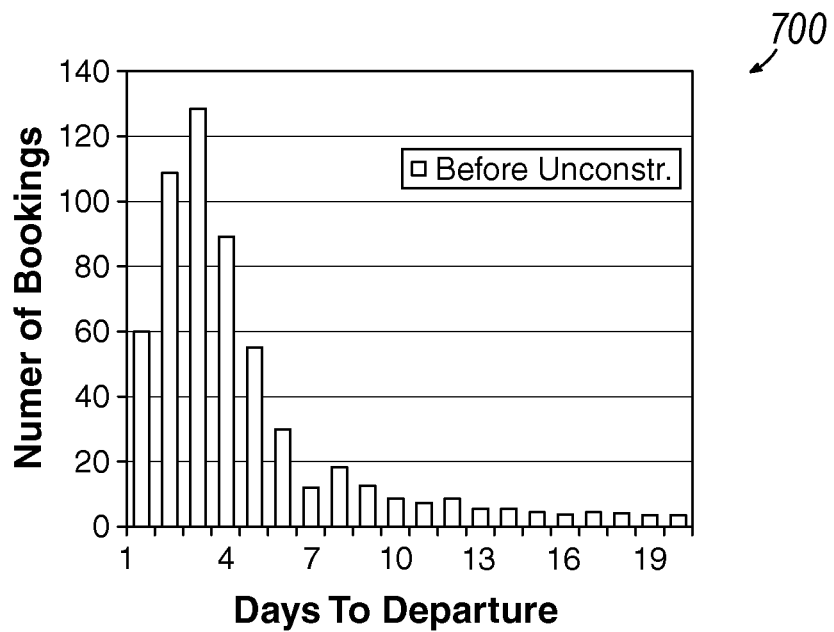
FIGS. 13A-B illustrate an example unconstraining that may be performed to unconstrain a booking tree model.

FIG. 13A provides a chart 700 that illustrates a number of bookings (i.e., a booking counter) for an O&D pair corresponding to days to departure. As shown, bookings in the days leading up to departure generally hit a maximum then decline. The decline is generally related to the limited availability of the travel service associated with the O&D pair, and not the demand. Hence, embodiments of the invention may unconstrain the booking counter node to reflect demand.

Figure 13B:
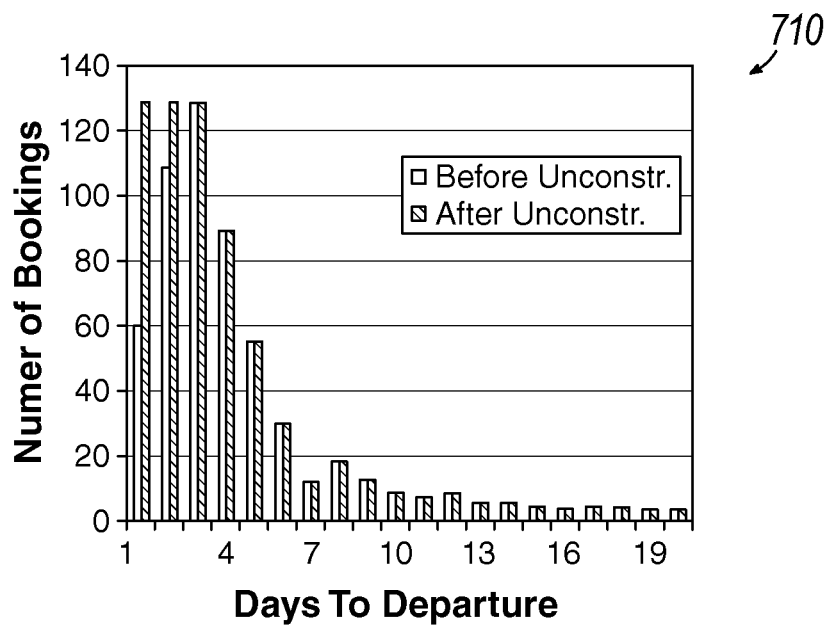

FIG. 13B provides a chart 710 that illustrates an unconstraining of the booking counter of FIG. 13A. As shown, the unconstrained demand counter does not decline as the day to departure approaches after reaching a maximum number. In general, unconstraining a booking counter comprises setting demand as a constant starting from the point where the maximum is reached until the departure date. Hence, embodiments of the invention may unconstrain booking counters of a booking tree model into demand counters as illustrated herein to thereby transform the retrieved ticket records into demand.

Figure 14:
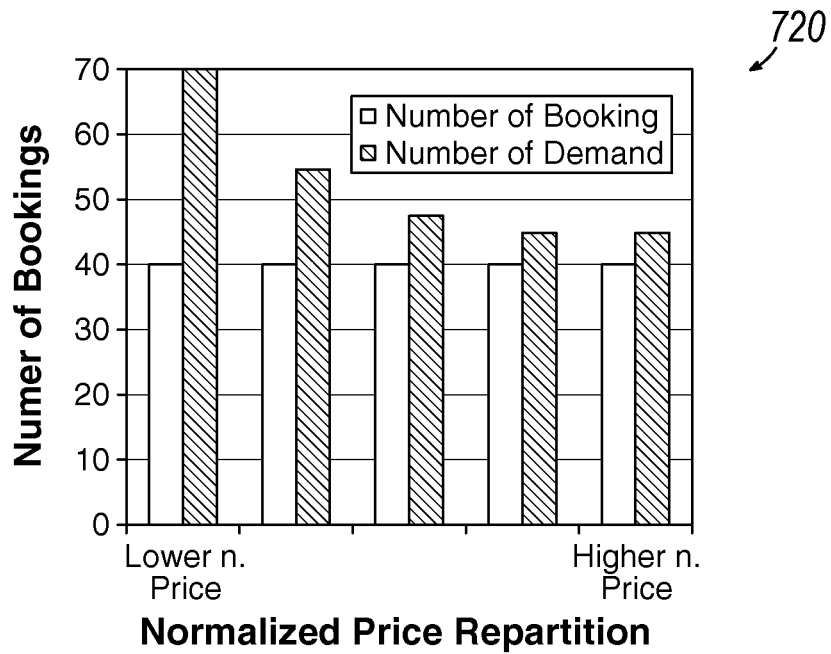
FIG. 14 illustrates an example unconstraining that may be performed to unconstrain a booking tree model.

FIG. 14 provides a chart 720 that illustrates unconstraining of the booking counter for the normalized price ranges into demand. As will be appreciated, the number of bookings for each price range is not reflective of demand. Due to the limited availability of travel inventory items (and bookings thereof), some demand is not met. For example, travelers may be unable to book a desired flight because the available fares are too high and/or the desired flight is full. As will be appreciated, demand will generally exceed availability, especially with regard to lower priced fares/classes. Consistent with embodiments of the invention, booking counters associated with the price range nodes may be unconstrained to a demand counter based on a multiplicative factor that may be applied to the booking counters. The multiplicative factor may be determined based on a calibration process. Hence, embodiments of the invention may unconstrain booking counters for price range nodes of a booking tree model into demand counters as illustrated herein to thereby transform the retrieved ticket records into demand.

Figure 15:
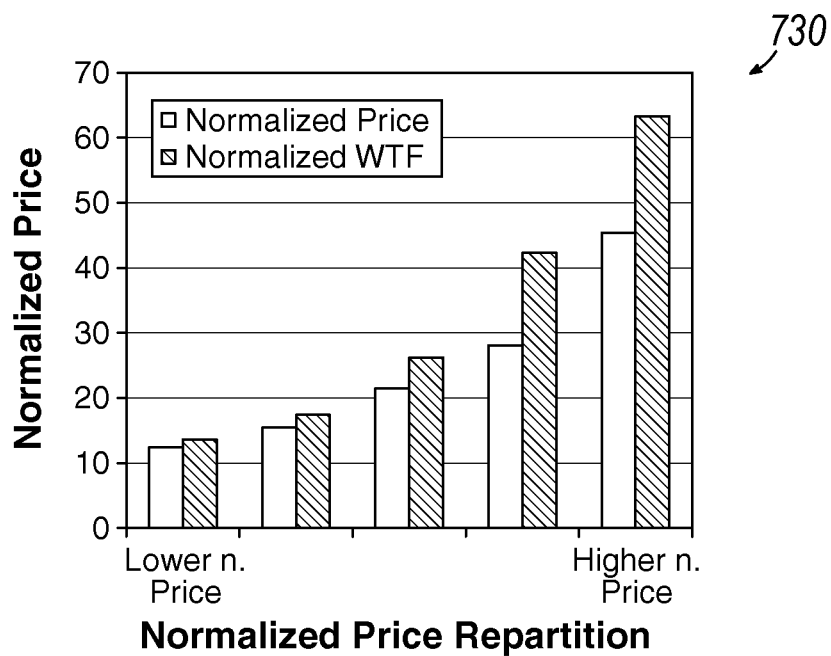
FIG. 15 illustrates an example unconstraining that may be performed to unconstrain a booking tree model.

FIG. 15 provides a chart 730 that illustrates unconstraining the price range nodes into willingness-to-pay nodes. As will be appreciated, the price range nodes are based on a normalization of ticket prices for an aggregated O&D node. However, the prices paid in the retrieved ticket records may not accurately reflect a price a traveler would be willing to pay. In particular, higher priced fares/classes may have relatively lower price sensitivity, while low priced fares/classes may generally have relatively higher sensitivity to price. Embodiments of the invention may unconstrain the price range nodes into willingness-to-pay based at least in part on a multiplicative factor, where such factor may reflect the lower price sensitivity for high priced fares/classes and the higher price sensitivity for low price fares/classes. The multiplicative factor may be determined based on a calibration process. Hence, embodiments of the invention may unconstrain price range nodes of a booking tree model into willingness-to-pay as illustrated herein to thereby transform the retrieved ticket records into demand.

After each unconstraining of nodes of the booking tree model, embodiments of the invention may synchronize nodes of the tree associated with the unconstrained nodes to thereby realign associated nodes based on the unconstraining. As will be appreciated, each node of the booking tree model is dynamically linked to booking data associated with the node. Therefore, when unconstraining a node of the booking record tree, the changes are propagated to other associated nodes, via the linked booking data. FIGS. 16A-D illustrate an example of unconstraining and subsequent synchronization for nodes of a booking tree model.

In FIG. 16A, for a node 738, a number of bookings 740 and a sum-of-fares 742 may be unconstrained, such that the data of both the number of bookings 740 and the sum-of-fares 742 have been modified. As shown, booking data 744 linked to the node 738 is not synchronized. In particular, a booking counter 746 and fare data 748 associated with the node 738 have not been updated.

In FIG. 16B the booking data 744 linked to the unconstrained node 738 has been synchronized based on the modification to the number of bookings 740 and the sum of fares 742. In particular, if a number of bookings 740 is increased by X %, then the booking counter 746 linked to the number of bookings 740 is increased by X %. Similarly, if a sum-of-fares 742 is increased by Y %, then the fare data 748 of the linked booking data is increased by Y %.

After the booking data 744 is updated for the unconstrained node 738, the data processing system 100 synchronizes the changes across any other nodes associated with the booking data 744 (and the unconstrained node 738). As shown in FIG. 16C, one or more nodes of other types 749 are not synchronized with the linked booking data 744. In particular, a number of bookings 750 and a sum-of-fares 752 of the one or more nodes 749 are not synchronized with the booking data 744 due to the unconstraining Due to the changes at the booking data level, embodiments of the invention update the one or more other nodes 749 as shown in FIG. 16D. In general, the data processing system applies the changes of the linked booking data 744 to each linked node of the booking tree model. As will be appreciated, after unconstraining and synchronization, the booking tree model is converted to a demand model. The demand model may be stored in a data structure of the memory of the data processing system 100.

Figure 17:
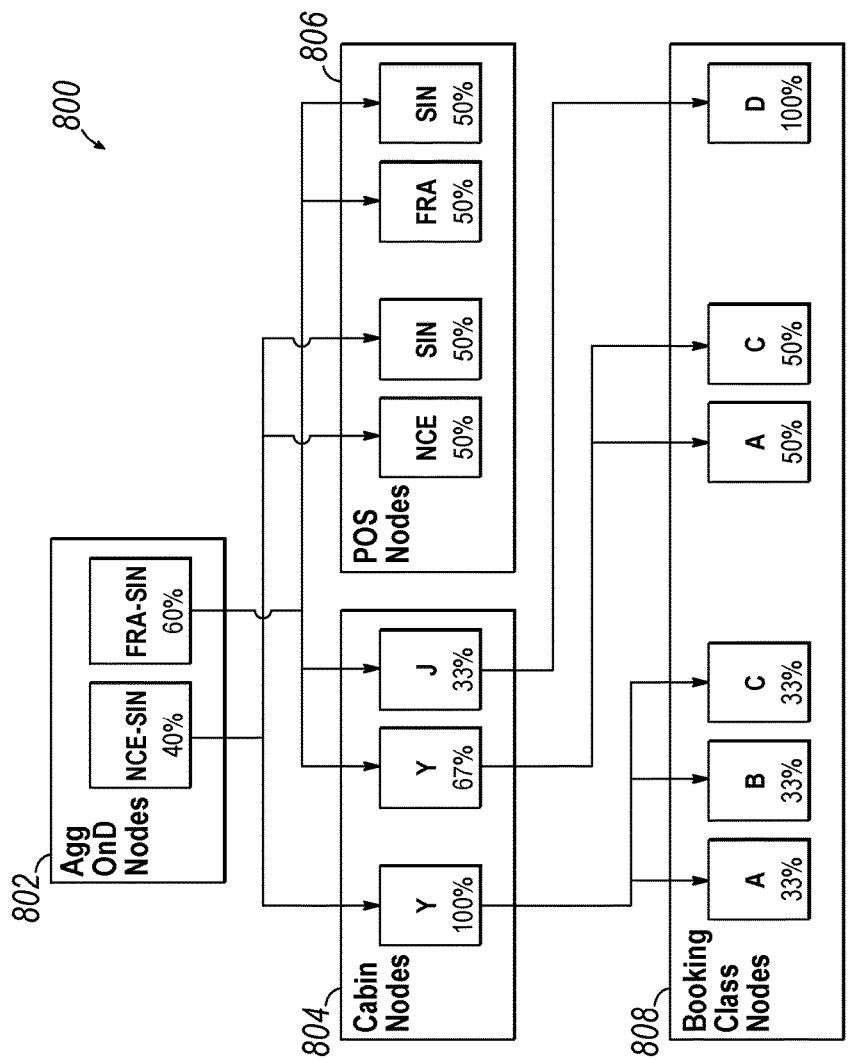
FIG. 17 is a diagrammatic illustration of an example demand model that may be generated by the data processing system of FIG. 1.

FIG. 17 is a diagrammatic illustration of a simplified demand model 800 represented in a tree structure. As shown, aggregated O&D nodes 802 may be associated with cabin nodes 804 and point of sale (POS) nodes 806, and the cabin nodes 804 may be further associated with booking class nodes 808. As will be appreciated, the provided simplified demand model is merely for illustrative purposes, and embodiments of the invention may generate demand models comprising additional types of associated nodes in various organizations/relations. In this example, the demand model 800 includes data associated with each node 802-808 that indicates a proportion of demand that is associated with the particular characteristic associated with the node. For example, as shown, the demand model 800 indicates that aggregated O&D node 802 'NCE-SIN' corresponds to 40% of demand for travel inventory items. Similarly, aggregated O&D node 802 'FRA-SIN' corresponds to 40% of demand for travel inventory items.

As shown, for the 'NCE-SIN' aggregated O&D node 802, 100% of demand corresponds to a cabin 'Y' represented by a cabin node 804, and 33% of the demand from the 'Y' cabin node 804 for the 'NCE-SIN' aggregated O&D node is divided between three booking classes that are each represented by a booking class node 808: an 'A' booking class, a 'B' booking class, and a 'C' booking class. For the 'FRA-SIN' aggregated O&D node 802, the demand model 800 indicates that 67% of demand corresponds to a 'Y' cabin and 33% corresponds to a T cabin, where each cabin is represented by a cabin node 804 associated with the 'FRA-SIN' aggregated O&D node 802. For the 'FRA-SIN' aggregated O&D node 802 and the 'Y' cabin node 804, demand is 50% for an 'A' booking class and 50% for a 'C' booking class, where each booking class is represented by a booking class node 808 associated with the 'FRA-SIN' aggregated O&D node 802 and the 'Y' cabin node 804. For the 'FRA-SIN' aggregated O&D node 802 and the T cabin node 804, 100% of demand is for a 'D' booking class that is represented by a 'D' booking class node 808 associated with the 'FRA-SIN' aggregated O&D node 802 and the T cabin node 804.

Furthermore, for the 'NCE-SIN' aggregated O&D node 802, the demand model 800 indicates that 50% of demand is associated with the point of sale of Nice, France (NCE) and 50% of demand is associated with the point of sale of Singapore (SIN), where each point of sale is represented by point of sale node 806 associated with the 'NCE-SIN' aggregated O&D node 802. For the 'FRA-SIN' aggregated O&D node 802, the demand model 800 indicates that 67% of demand is associated with the point of sale of Frankfurt, Germany (FRA) and 33% is associated with a point of sale of Singapore, where each point of sale is represented by a point of sale node 806 associated with the 'FRA-SIN' aggregated O&D node 802.

Figure 18:
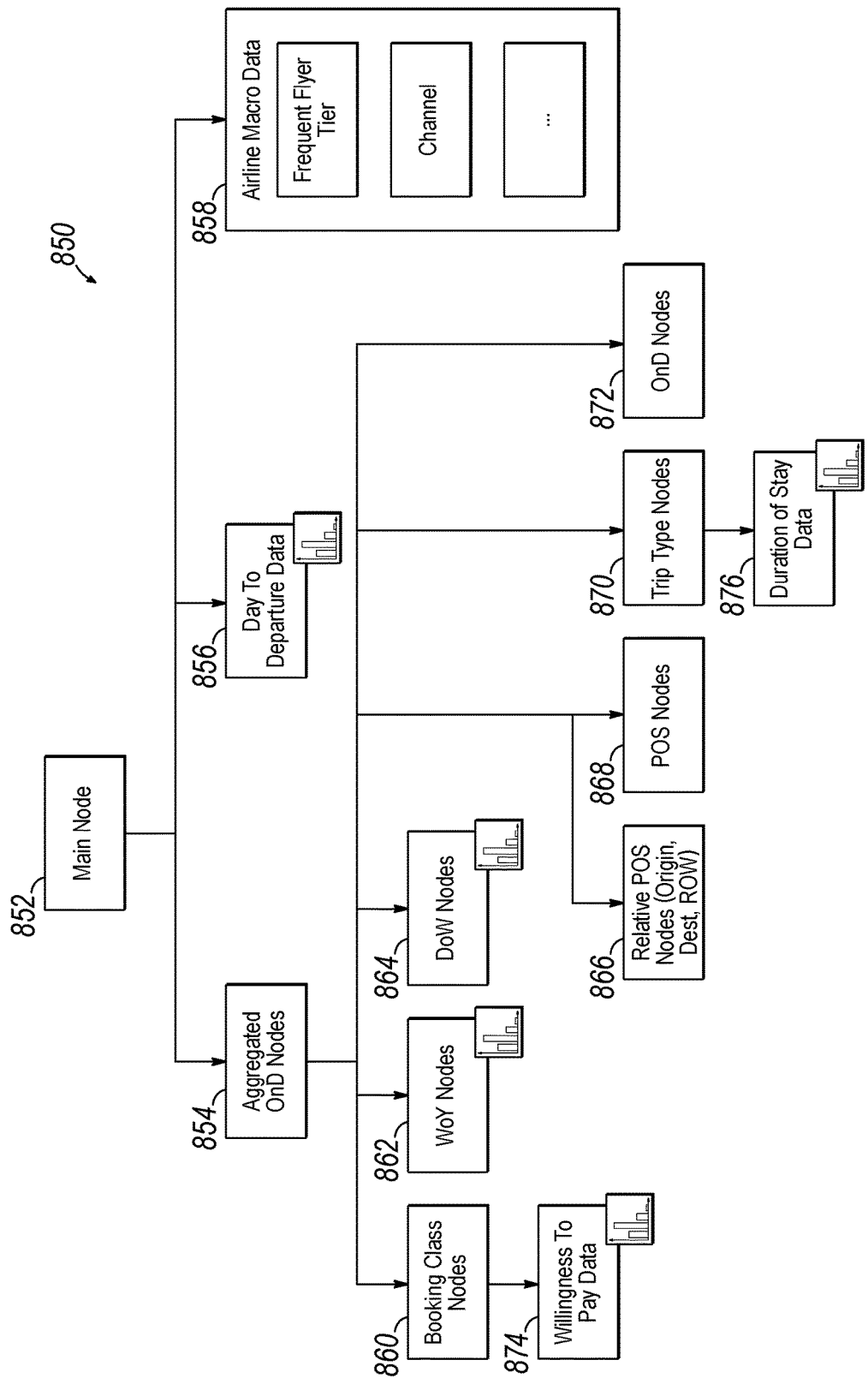
FIG. 18 is a diagrammatic illustration of an example topography of a demand model that may be generated by the data processing system of FIG. 1.

FIG. 18 provides an example diagrammatic illustration of a topography of a demand model 850 consistent with embodiments of the invention. As shown, a main node 852 of the demand model may be connected to one or more aggregated O&D nodes 854, a day to departure node 856, and/or one or more nodes 858 that include information determined from travel merchant data, such as a frequent flyer tier level, a booking channel, and/or other such data. Each aggregated O&D node 852 is associated with one or more booking class nodes 860, a week of the year node 862, a day of the week node 864, one or more relative point of sale nodes 866, one or more point of sale nodes 868, one or more trip type nodes 870, and/or one or more O&D nodes 872. Furthermore, each booking class node 860 may be associated a willingness-to-pay nodes 874, and each trip type node 870 may be associated with a duration of stay node 876. As shown, the nodes may store information that is based on one or more retrieved ticket records. Generally, the demand model 850 may be stored in a data structure of the memory of the data processing system 100 such that the relational tree structure illustrated in FIG. 18 may be read and/or accessed by the at least one processor.

Figure 19:
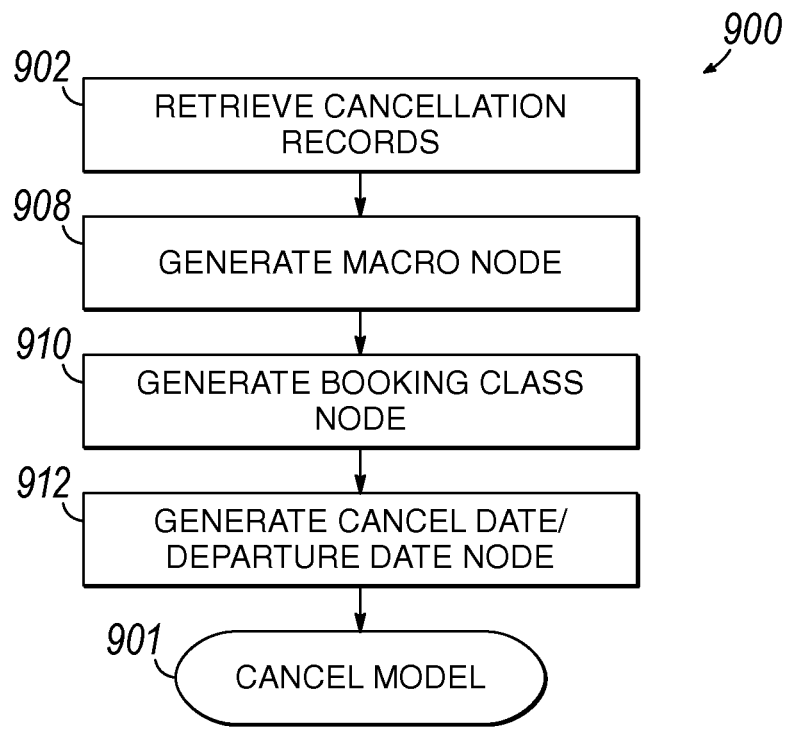
FIG. 19 is a flowchart illustrating a sequence of operations that may be performed by the data processing system of FIG. 1 to generate a cancel model.

FIG. 19 provides a flowchart 900 that illustrates a sequence of operations that may be performed by the data processing system 100 to generate a cancel model 901 consistent with embodiments of the invention. As will be appreciated, some records stored in an electronic ticket server correspond to cancellations, and the data processing system retrieves all such cancellation records (block 902). Based on the retrieved cancellation records, the data processing system 100 determines a global number of cancellations for the travel merchant, and the data processing system generates a macro cancel node for based on the global number of cancellations (block 908). The macro cancel node stores a global number of cancellations determined for the travel merchant and the global number of demand. The data processing system 100 determines a probability that a cancellation is requested based on a booking request from the retrieved cancellation records, and the data processing system generates one or more booking class nodes (block 910), where each booking class node is associated with a booking class and each booking class node indicates the determined probability of cancellation for the associated booking class. The data processing system 100 analyzes the cancellation records and determines a cancellation date relative to a departure date based statistical reparation, and the data processing system 100 generates a cancel date/departure date node (block 912) that includes information that indicates a probability of cancellation relative to the number of days until the departure date.

Figure 20:
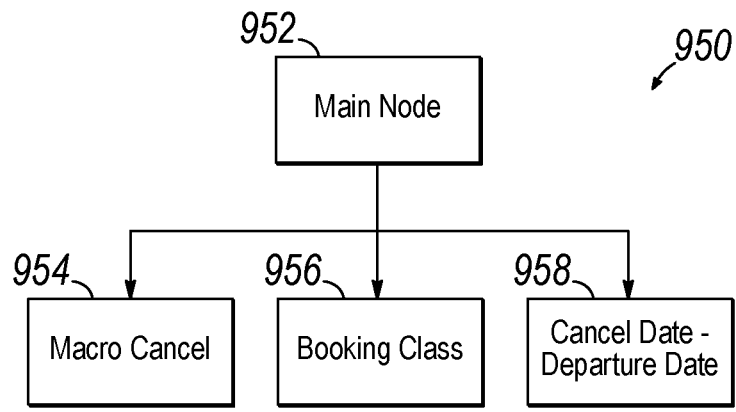
FIG. 20 is a diagrammatic illustration of an example topography of a cancel model that may be generated by the data processing system of FIG. 1.
Figure 21:
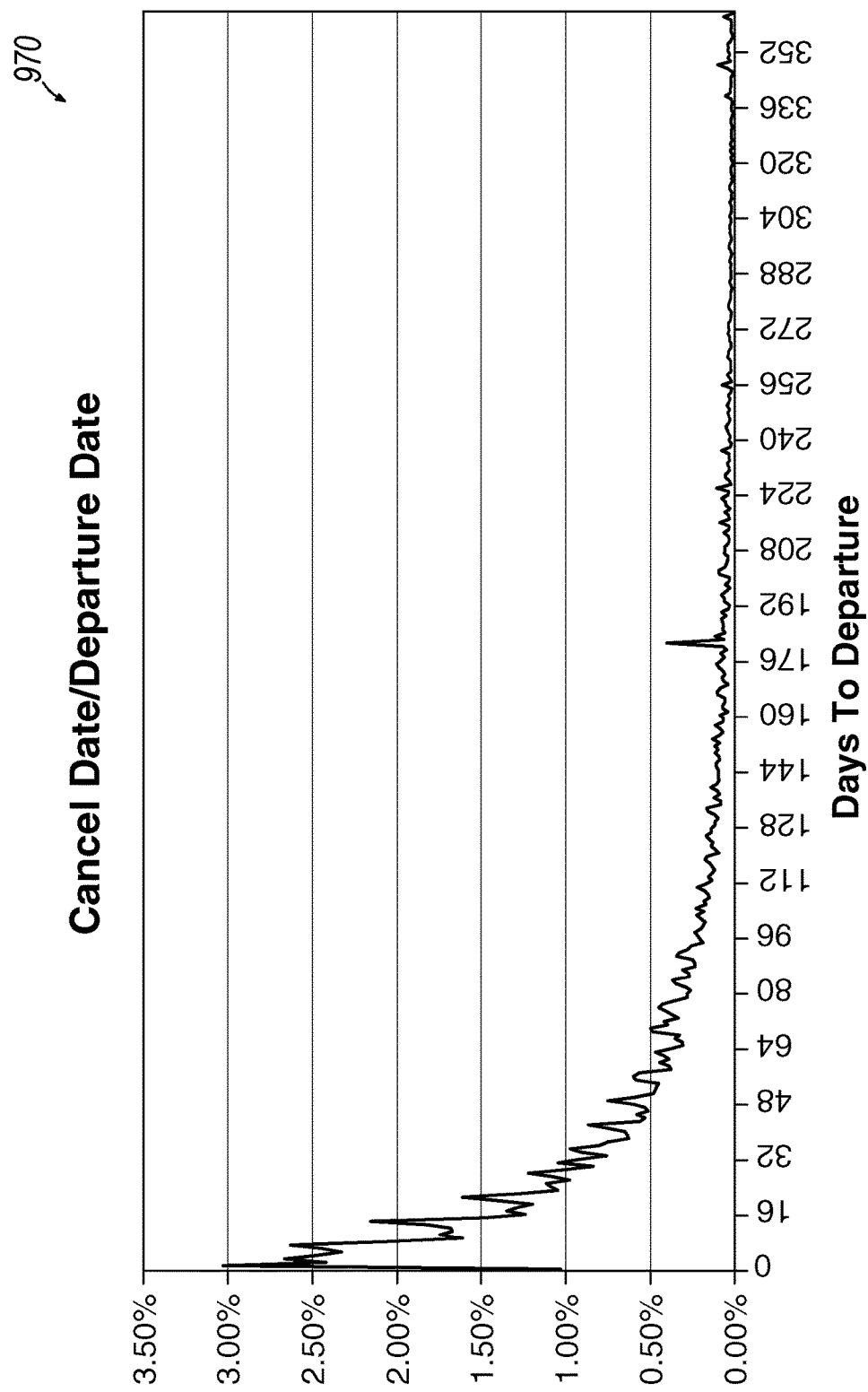
FIG. 21 is a chart that illustrates a day to departure correlated cancellation rate that may be incorporated in a cancel model consistent with some embodiments of the invention.

FIG. 20 provides a diagrammatic illustration of a topography of a cancel model 950 consistent with embodiments of the invention. As shown, a main node 952 may be associated with a macro cancel node 954, one or more booking class nodes 956, and/or a cancel-departure date node 958. In general, the cancel model 950 may be stored in a data structure of the memory of the data processing system such that the relational tree structure illustrated in FIG. 20 may be accessed and read by the at least one processor. FIG. 21 illustrates a chart 970 of statistical information that may be stored in the cancel date/departure date node of a cancel model. As shown, a cancellation rate may be determined for a range of days prior to a departure date.

As will be appreciated, the demand model generated by the data processing system 100 may be used to generate simulated demand requests, and the cancel model generated by the data processing system 100 may be used to generate simulated cancel requests associated with some of the simulated demand requests. Simulated demand requests and simulated cancel requests generally comprise a demand line (e.g., a booking demand line or a cancellation demand line), where each demand line corresponds to a single booking or cancellation request for a simulated customer to the travel merchant. Each demand line generally includes all attributes associated with the booking or cancellation demand, including, for example, an O&D, a POS, a willingness-to-pay, etc. A plurality of demand lines for a particular day of a range of simulation days may be stored in the memory of the data processing system as a demand file. Therefore, for a range of simulation days, the data processing system generates a plurality of simulated demand requests with or without simulated cancel requests with the demand model with or without the cancel model. As will be appreciated, the data processing system 100 determines a global number of demand requests for the travel merchant for each day of a range of simulation days. The data processing system 100 generates the simulated demand requests, including booking demand lines, using the demand model, and the data processing system 100 generates the simulated cancel requests, including cancellation demand lines, using the demand model and the cancel model. As used herein booking demands and/or customer demands corresponds to a number of customers ready to buy a travel inventory item (e.g., a plane ticket).

Figure 22:
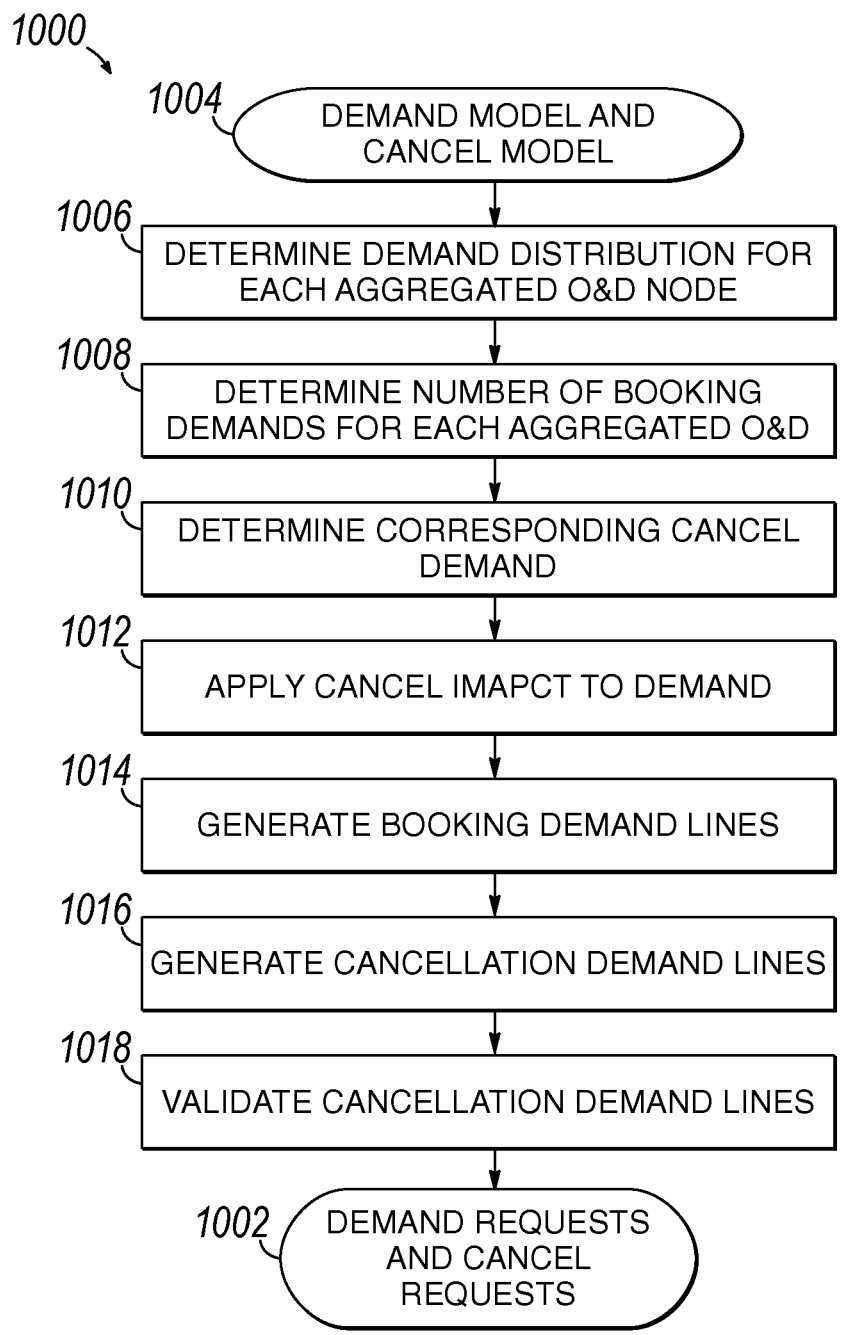
FIG. 22 is a flowchart illustrating a sequence of operations that may be performed by the data processing system of FIG. 1 to generate simulated demand requests and simulated cancel requests.

FIG. 22 provides a flowchart 1000 that illustrates a sequence of operations that may be performed by the data processing system 100 to generate simulated demand requests and cancel requests 1002 based on a demand model and cancel model 1004 consistent with embodiments of the invention. The data processing system determines a demand distribution for each aggregated O&D node of the demand model (block 1006). The data processing system may determine a number of booking demands for each aggregated O&D node based on the demand distribution determined for the aggregated O&D node (block 1008). As will be appreciated, the demand distribution for each aggregated O&D node may be a normal distribution if the demand model does not store booking data based on seasonality (e.g., week of the year relevant demand information). If the demand model stores booking data based on seasonality, the data processing system determines booking demands, for each aggregated O&D node, based on a day-to-departure node associated with the aggregated O&D node, which provides a statistical correlation between a departure date and a day of the range of simulation days. After determining the booking demands for each aggregated O&D node, the data processing system determines a global cancellation demand for the range of simulation days based on a macro cancel node of the cancel model (block 1010), and the data processing system determines a cancel percentage from the data stored in the macro cancel node. Based on the cancel percentage, the data processing system increases the determined booking demand number (block 1012).

Using the number of booking demands for each aggregated O&D node, the data processing system generates a corresponding number of booking demand lines (block 1014), where the information for each booking demand line is determined with the demand model. To determine all information for a booking demand line, the data processing system 100 performs a drawing for each determined booking demand to generate a booking demand line. As will be appreciated, a drawing may comprise a dynamic querying of one or more nodes of the demand model, where such dynamic querying is based at least in part on information of the booking demand line. For example, if a booking demand line is being generated for a particular aggregated O&D node, embodiments of the invention may perform dynamic querying of one or more nodes associated with the aggregated O&D node to determine further information for the demand line. Consistent with embodiments of the invention, the data processing system 100 determines a cabin, a point of sale, a willingness-to-pay, a booking class, reservation date, departure date, origin, destination, trip type, frequent flyer tier, and/or other such information/attributes that may be included in the booking demand line.

For example, for a point of sale for each demand line, the data processing system 100 analyzes a relative point of sale node associated with an aggregated O&D node of the demand model. The data processing system 100 performs a statistical drawing on the relative point of sale node. If the result of the drawing is 'Origin', the origin of the booking demand line is set as the point of sale; if the result of the drawing is 'Destination', the destination of the booking demand line is set as the point of sale; if the result of the drawing is not 'Origin' or 'Destination', the data processing system performs a drawing on a point of sale node, and the result of the drawing is set as the point of sale for the demand line. As another example, the data processing system determines a willingness-to-pay for each booking demand line by selecting a willingness-to-pay node based at least in part on other information of the demand line. Furthermore, as will be appreciated, a round trip may require two booking demand lines: a demand line for an outbound portion of the round trip journey, and a demand line for a return portion of the round trip journey. Therefore, during drawing of the demand model, if a trip type indicating a 'Round Trip' is returned, the data processing system may generate a first booking demand line for the outbound portion, and a second booking demand line for the return portion. In general, the second booking demand line is generated by inverting the origin and destination for the first demand line and determining a departure date based on a duration of stay node.

Using the demand model and the cancel model, the data processing system generates cancellation demand lines (block 1016) by performing a drawing on the nodes of the cancel model. For each cancellation demand line, the data processing system 100 determines attributes for the cancellation demand line, where such attributes include, for example booking demand date, a booking demand line identifier, a cancellation time, a cancellation date, a cancellation class list, and/or an iteration number. As will be appreciated, a cancellation demand line generally corresponds to a booking demand line, where the cancellation demand line cancels a booking caused by the booking demand line. Therefore, the information of a cancellation demand line generally identifies the corresponding booking demand line and includes information relevant for processing the cancellation of the corresponding booking demand line. A booking demand date corresponds to the request date of the corresponding booking demand line. A demand line identifier corresponds to a line identifier of the corresponding booking demand line. A cancellation time is determined from a drawing performed on a uniform cancellation distribution of the cancel model. A cancellation date is determined from a drawing of the cancel-departure date node. A cancellation class is determined from a drawing of the booking class node of the cancel model. An iteration number corresponds to an iteration number of the corresponding demand line. After generating a cancellation demand line, the data processing system validates the cancellation demand line (block 1018). A cancellation demand line is valid (and stored in demand files for cancel requests) if a cancel class list attribute, a cancellation date is not before the demand date of the corresponding booking demand line, and the cancellation date is not outside the range of simulation days. The booking demand lines and cancel demand lines are stored for use in a simulation for a range of simulation days.

Figure 23:
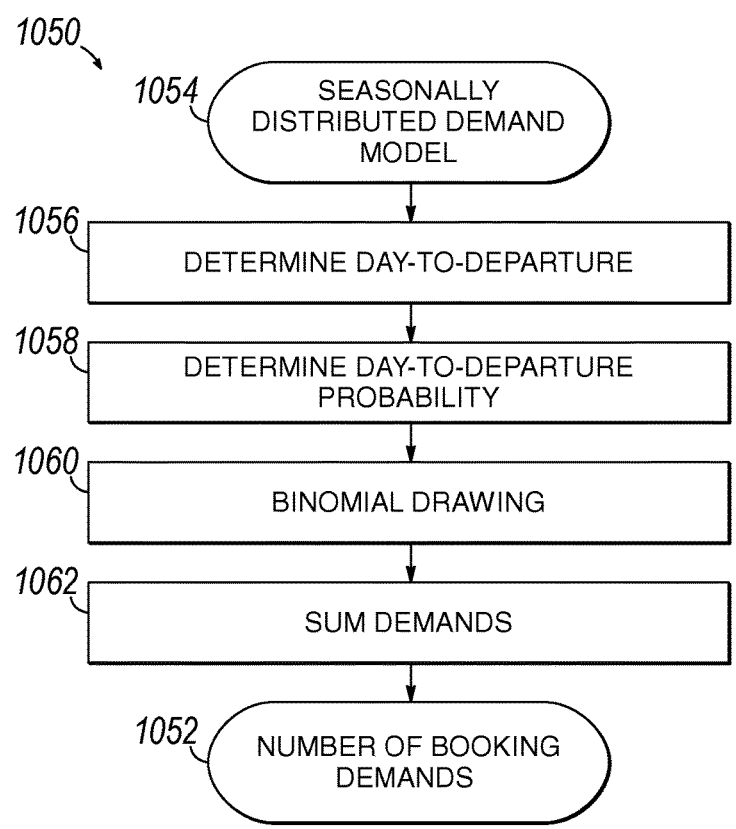
FIG. 23 is a flowchart illustrating a sequence of operations that may be performed by the data processing system of FIG. 1 to determine a number of demands for a travel merchant for a range of simulation days.

FIG. 23 provides a flowchart 1050 that illustrates a sequence of operations that may be performed by the data processing system 100 to determine a number of booking demands using a seasonally-distributed demand model 1054. For a seasonally-distributed demand model, the data processing system 100 performs one or more drawings on nodes of the demand model. With a seasonality implementation, demand generally depends on a departure date. Therefore, for each departure date (of a range of simulation days) in a day-to-departure distribution node of the demand model, the data processing system determines a day-to-departure (block 1056). The data processing system determines a probability to have a demand for the determined day-to-departure based on the day-to-departure distribution node (block 1058), and the data processing system 100 performs a binomial drawing (block 1060) based on a number of demand determined for the departure date and the probability to have demand on the day-to-departure. The results of the binomial drawing for each departure date are summed (block 1062) to thereby determine a global number of booking demands.

Figure 24B:
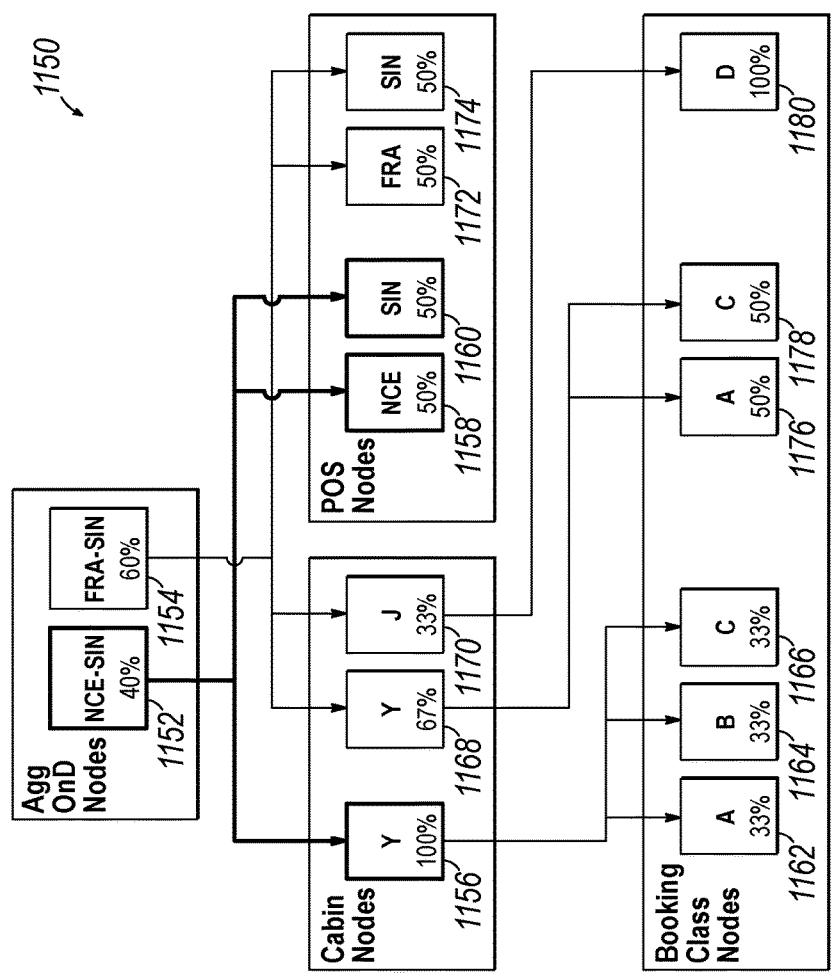

FIGS. 24A-F illustrate an example generation of booking demand lines based on a simplified demand model. As will be appreciated, the demand model is provided in a tree relational structure for illustrative purposes. Demand models consistent with embodiments of the invention may be stored in a data structure of a memory of the data processing system such that associated nodes are linked to underlying booking data and relationally associated with other nodes of the demand model. Therefore, performing a drawing, as described herein, may comprise performing dynamic querying of nodes of the demand model, where a dynamic query of a particular node may be generated based at least in part on results returned from at least one other relationally associated node. FIG. 24A provides a table 1100 that provides example demands for aggregated O&D nodes of the demand model. In particular, a first aggregated O&D node 'NCE-SIN' is determined to have a demand of three (provided as '3') and a second aggregated O&D node FRA-SIN is determined to have a demand of two (provided as '2').

In FIG. 24B, a simplified demand model 1150 of is provided. As shown, the demand model 1150 comprises a 'NCE-SIN' aggregated O&D node 1152 and a 'FRA-SIN' aggregated O&D node 1154. For the 'NCE-SIN' aggregated O&D node 1152, the demand model 1150 includes a 'Y' cabin node 1156, a 'NCE' POS node 1158, and a 'SIN' POS node 1160. For the 'Y' cabin node 1156 associated with the "NICE-SIN" aggregated O&D node 1152, the demand model includes an 'A' booking class node 1162, a 'B' booking class node 1164, and a 'C' booking class node. Furthermore, the demand model 1150 comprises, for the 'FRA-SIN' aggregated O&D node 1154, a 'Y' cabin node 1168, a 'J' cabin node 1170, a FRA POS node 1172, and a 'SIN' POS node 1174. For the 'Y' cabin node 1168 of the 'FRA-SIN' aggregated O&D node 1154, the demand model 1150 includes an 'A' booking class node 1176 and a 'C' booking class node 1178. For the 'J' cabin node 1170 of the 'FRA-SIN' aggregated O&D node 1154, the demand model 1150 includes a 'D' booking class node 1180. In this example, a drawing of the demand model is illustrated in dashed lines for the 'NCE-SIN' aggregated O&D node 1152.

Figure 24D:
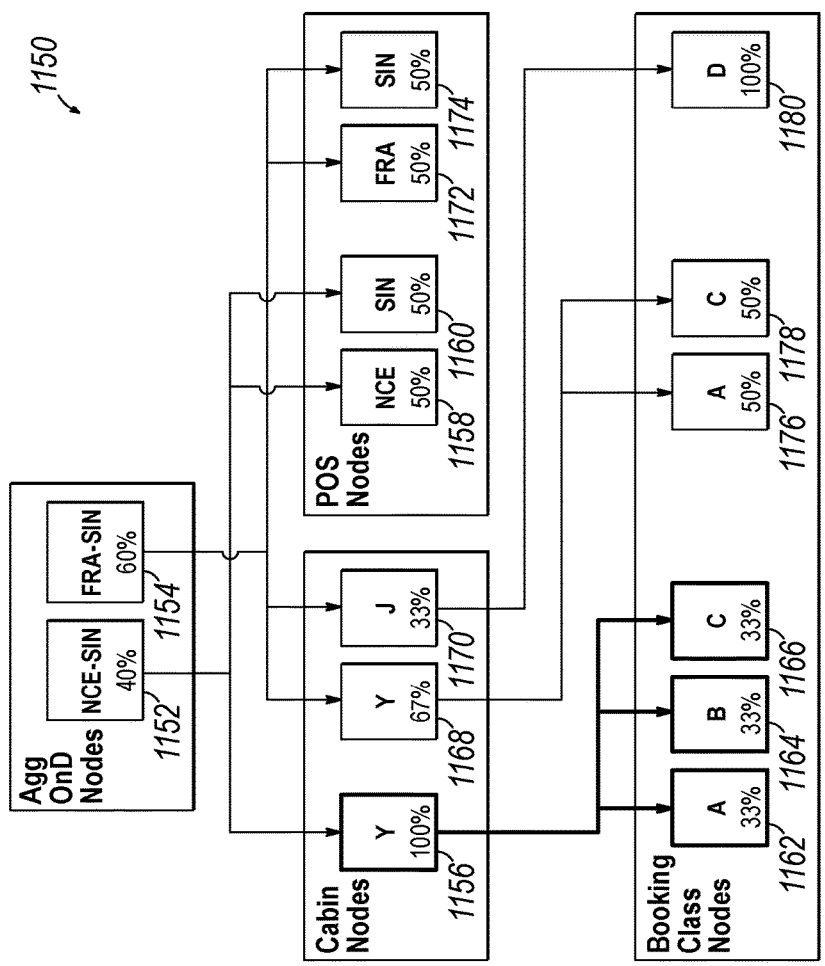

FIG. 24C provides a table 1200 that provides a result from a drawing on the demand model for the 'NCE-SIN' aggregated O&D node. As shown, information for a booking demand line 1202 is determined: for an aggregated O&D node of 'NCE-SIN', a cabin for the first booking demand line is 'Y', and a point of sale is 'NCE'. FIG. 24D illustrates a drawing on the demand model 1150 that is based on the information determined for the booking demand line 1202 provided in dashed lines. Continuing the example, after determining that the cabin for the first booking demand line 1202 is 'Y', the data processing system performs a drawing on booking class nodes 1162-1166 associated with the 'Y' cabin node 1156 of the 'NCE-SIN' aggregated O&D node 1152 to determine a booking class for the booking demand line 1202. FIG. 24E provides a table 1220 that provides the determined booking class (i.e., booking class 'A') for the booking demand line 1202.

FIG. 24F provides a table 1240 that provides example results from drawings performed on the demand model 1150 for the determined demands to generate booking demand lines 1242-1248 in the same manner described above for the booking demand line 1202. In the example, the demand for the aggregated O&D 'NCE-SIN' was three, and three booking demand lines were generated by drawing on the demand model 1150. In particular, for the aggregated O&D node 'NCE-SIN', the data processing system generates: the booking demand line 1202; a booking demand line 1242 with a cabin of 'Y', a point of sale of SIN, and a booking class of 'A'; and a booking demand line 1244 with a cabin of 'Y', a point of sale of NCE, and a booking class of 'B'. In the example, demand for the 'FRA-SIN' aggregated O&D was two, and two booking demand lines were generated by drawing on the demand model 1150. In particular, for the aggregated O&D node 'FRA-SIN', the data processing system generates: a booking demand line 1246 with a cabin of 'Y', a point of sale of 'FRA', and a booking class of 'A'; and a booking demand line 1248 with a cabin of 'J', a point of sale of 'SIN', and a booking class of 'D'.

Therefore, as will be appreciated, embodiments of the invention generate a demand model that may be used to benchmark database management of travel inventory items of an inventory system consistent with embodiments of the invention. In particular, simulated demand requests and/or simulated cancel requests may be generated that may facilitate simulated booking and cancellation of travel inventory items managed by the inventory system. As will be appreciated, the inventory system generally manages real travel inventory items (i.e., production data). Consistent with embodiments of the invention, generation of the simulated demand requests and/or cancel requests generated generally transform retrieved ticket records into a simulated demand for production travel inventory items managed by the inventory system. As will be appreciated, generation of the simulated demand requests may comprise dynamic querying of one or more nodes of the demand model to generate booking demand lines. Similarly, generation of the simulated cancel requests may comprise dynamic querying of the demand model and the cancel model to generate cancellation demand lines. Embodiments of the invention therefore address benchmarking and evaluation shortcomings in the highly computerized electronic travel management and reservation technology area.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system of determining booking demand for production travel inventory items managed by an inventory system, the system comprising:
   at least one processor; and
   a memory coupled with the at least one processor, the memory comprising:
      a data structure stored thereon and configured to store a demand model; and
      program code stored thereon and configured to be executed by the at least one processor to cause the at least one processor to:
         retrieve a plurality of ticket records from a ticket database of an electronic ticket server, wherein each ticket record of the plurality includes at least one travel segment and a ticket price;
         analyze the at least one travel segment of each ticket record to determine a plurality of origin and destination (O&D) pairs for each ticket record;
         compute an O&D price for each of the O&D pairs for each ticket record based at least in part on the ticket price of the ticket record;
         generate the demand model in a data structure of the memory based at least in part on the O&D pairs and the O&D price for each of the O&D pairs for each ticket record by:
            generating a plurality of aggregated O&D nodes in the data structure based on the O&D pairs, wherein each aggregated O&D node corresponds to a subset of O&D pairs of the O&D pairs; and
            generating, for each aggregated O&D node having at least one corresponding O&D pair of the subset of O&D pairs, an associated duration of stay distribution node in the data structure that includes a duration of stay statistical distribution that is based at least in part on a duration of stay determined for each of the at least one corresponding O&D pair of the subset of O&D pairs; and
         simulating, with the at least one processor, the booking demand of a global distribution system for the production travel inventory items over a range of simulation days using the demand model.

2. The system of claim 1, wherein each aggregated O&D node comprises a booking counter that indicates a number of ticket records associated with the subset of O&D pairs corresponding to the aggregated O&D node.

3. The system of claim 1, wherein the program code generates the demand model in the data structure by:
   for each aggregated O&D node, determining a normalized price distribution based at least in part on the O&D price of the subset of O&D pairs corresponding to the aggregated O&D node; and
   generating, for each aggregated O&D node, one or more relationally associated price distribution nodes in the data structure based at least in part on the normalized price distribution determined for the aggregated O&D node.

4. The system of claim 1, wherein the program code is further configured to:
   for each ticket record:
      analyze a first O&D pair and a second O&D pair of the O&D pairs for the ticket record to determine whether the ticket record corresponds to a round-trip itinerary based at least in part on geographical distance between an origin of the first O&D pair and a destination of the second O&D pair and further based at least in part on a geographical distance between a destination of the first O&D pair and an origin of the second O&D pair;
      in response to determining that the ticket record corresponds to a round-trip itinerary:
         determine a stay duration for the round-trip itinerary based at least in part on an arrival time of the first O&D pair and a departure time of the second O&D pair;
         discard the second O&D pair; and
         set a trip type associated with the first O&D pair in the ticket record to thereby identify the first O&D pair as corresponding to the round-trip itinerary.

5. The system of claim 1, wherein each of the O&D pairs for each ticket record identifies an origin and a destination for the ticket record, and the program code computes the O&D price for each O&D pair for each ticket record based at least in part on the ticket price of the ticket record by:
   determining a price factor for each of the O&D pairs based at least in part on geographical distance between the origin and destination of the O&D pair,
   wherein the O&D price for each O&D pair is computed based at least in part on the price factor for the O&D pair.

6. The system of claim 1, wherein each aggregated O&D node includes a booking counter that indicates a number of associated ticket records and the program code generates the demand model in the data structure of the memory based at least in part on the O&D pairs and the O&D price of each of the O&D pairs for each ticket record by:
   generating at least one criteria node in the data structure for each aggregated O&D node, wherein the at least one criteria node for each O&D node is based at least in part on the ticket records associated with the aggregated O&D node.

7. The system of claim 1, wherein the program code is further configured upon execution to cause the at least one processor to:
   determine a subset of ticket records from the plurality of ticket records that correspond to canceled bookings of ticketed travel inventory items;
   generate a cancelation model in the data structure of the memory based at least in part on the at least one travel segment of each of the subset of ticket records; and
   simulate cancelations for the production travel inventory items managed by the inventory system over the range of simulation days using the cancelation model.

8. The system of claim 1, wherein the program code generates the demand model in the data structure of the memory based at least in part on the O&D pairs and the O&D price of each of the O&D pairs for each ticket record by:
   generating an initial demand model based at least in part on the at least one travel segment and ticket price of each ticket record;
   determining a maximum number of bookings per day based at least in part on the initial demand model; and
   unconstraining a booking counter of the initial demand model based at least in part on the maximum number of bookings per day to thereby generate the demand model.

9. The system of claim 1, wherein the program code generates the demand model in the data structure of the memory based at least in part on the O&D pairs and the O&D price of each of the O&D pairs for each ticket record by:
  generating an initial demand model based at least in part on the at least one travel segment and ticket price of each ticket record, wherein each aggregated O&D node comprises one or more price distribution nodes that are based on the O&D price of the subset of O&D pairs;
  determining price ranges for each of the aggregated O&D nodes based on the one or more price distribution nodes; and
  unconstraining a booking counter of the initial demand model based at least in part on the price ranges determined for each aggregated O&D node to thereby generate the demand model.

10. A method of determining booking demand for production travel inventory items managed by an inventory system, the method comprising:
  retrieving, with at least one processor of a data processing system, a plurality of ticket records from a ticket database of an electronic ticket server, wherein each ticket record of the plurality includes at least one travel segment and a ticket price;
  in the data processing system, analyzing the at least one travel segment of each ticket record with the at least one processor to determine a plurality of origin and destination (O&D) pairs for each ticket record;
  computing, with the at least one processor, an O&D price for each of the O&D pairs for each ticket record based at least in part on the ticket price of the ticket record;
  generating, with the at least one processor, a demand model in a data structure of a memory of the data processing system based at least in part on the O&D pairs and the O&D price for each of the O&D pairs for each ticket record by:
    generating a plurality of aggregated O&D nodes in the data structure based on the O&D pairs, wherein each aggregated O&D node corresponds to a subset of O&D pairs of the O&D pairs; and
    generating, for each aggregated O&D node having at least one corresponding O&D pair of the subset of O&D pairs, an associated duration of stay distribution node in the data structure that includes a duration of stay statistical distribution that is based at least in part on a duration of stay determined for each of the at least one corresponding O&D pair of the subset of O&D pairs; and
  simulating, with the at least one processor, the booking demand of a global distribution system for the production travel inventory items over a range of simulation days using the demand model.

11. The method of claim 10, wherein each aggregated O&D node comprises a booking counter that indicates a number of ticket records associated with the subset of O&D pairs corresponding to the aggregated O&D node.

12. The method of claim 10, wherein generating the demand model in the data structure of the memory comprises:
  for each aggregated O&D node, determining a normalized price distribution based at least in part on the O&D price of the subset of O&D pairs corresponding to the aggregated O&D node; and
  generating, for each aggregated O&D node, one or more relationally associated price distribution nodes in the data structure based at least in part on the normalized price distribution determined for the aggregated O&D node.

13. The method of claim 10 further comprising:
  for each ticket record:
    analyzing, with the at least one processor, a first O&D pair and a second O&D pair of the O&D pairs for the ticket record to determine whether the ticket record corresponds to a round-trip itinerary based at least in part on geographical distance between an origin of the first O&D pair and a destination of the second O&D pair and further based at least in part on a geographical distance between a destination of the first O&D pair and an origin of the second O&D pair;
    in response to determining that the ticket record corresponds to a round-trip itinerary:
      determining a stay duration for the round-trip itinerary based at least in part on an arrival time of the first O&D pair and a departure time of the second O&D pair;
      discarding the second O&D pair; and
      setting a trip type associated with the first O&D pair in the ticket record to thereby identify the first O&D pair as corresponding to the round-trip itinerary.

14. The method of claim 10, wherein each of the O&D pairs for each ticket record identifies an origin and a destination for the ticket record, and computing the O&D price for each O&D pair for each ticket record based at least in part on the ticket price of the ticket record comprises:
  determining a price factor for each of the O&D pairs based at least in part on geographical distance between the origin and destination of the O&D pair,
  wherein the O&D price for each O&D pair is computed based at least in part on the price factor for the O&D pair.

15. The method of claim 10, wherein each aggregated O&D node includes a booking counter that indicates a number of associated ticket records and generating the demand model comprises:
  generating at least one criteria node in the data structure for each aggregated O&D node, wherein the at least one criteria node for each O&D node is based at least in part on the ticket records associated with the aggregated O&D node.

16. The method of claim 10, further comprising:
  determining a subset of ticket records from the plurality of ticket records that correspond to canceled bookings of ticketed travel inventory items;
  in the data processing system, generating, with the at least one processor, a cancelation model in the data structure of the memory of the data processing system based at least in part on the at least one travel segment of each of the subset of ticket records; and
  simulating cancelations for the production travel inventory items managed by the inventory system over the range of simulation days using the cancelation model.

17. The method of claim 10, wherein generating the demand model comprises:
  generating an initial demand model based at least in part on the at least one travel segment and ticket price of each ticket record;
  determining a maximum number of bookings per day based at least in part on the initial demand model; and
  unconstraining a booking counter the initial demand model based at least in part on the maximum number of bookings per day to thereby generate the demand model.

18. The method of claim 10, wherein generating the demand model comprises:
  generating an initial demand model based at least in part on the at least one travel segment and ticket price of each ticket record, wherein each aggregated O&D node comprises one or more price distribution nodes that are based on the O&D price of the subset of O&D pairs;
  determining price ranges for each of the aggregated O&D nodes based on the one or more price distribution nodes; and
  unconstraining a booking counter of the initial demand model based at least in part on the price ranges determined for each aggregated O&D node to thereby generate the demand model.

19. The method of claim 10, wherein generating the demand model comprises:
  generating an initial demand model based at least in part on the at least one travel segment and ticket price of each ticket record, wherein each aggregated O&D node comprises one or more price distribution nodes that are based on the O&D price of the subset of O&D pairs; and
  determining price ranges for each of the aggregated O&D nodes based on the one or more price distribution nodes; and
  unconstraining pricing information of the initial demand model into willingness-to-pay information based at least in part on the price ranges determined for each aggregated O&D node to thereby generate the demand model.

20. A computer program product comprising:
  a computer readable storage medium; and
  program code stored on the computer readable storage medium and configured, upon execution, to cause at least one processor to:
    retrieve a plurality of ticket records from a ticket database of an electronic ticket server, wherein each ticket record of the plurality includes at least one travel segment and a ticket price;
    analyze the at least one travel segment of each ticket record to determine a plurality of origin and destination (O&D) pairs for each ticket record;
    compute an O&D price for each of the O&D pairs for each ticket record based at least in part on the ticket price of the ticket record;
    generate a demand model in a data structure of a memory based O&D pairs and the O&D price for each of the O&D pairs for each ticket record by:
      generating a plurality of aggregated O&D nodes in the data structure based on the O&D pairs, wherein each aggregated O&D node corresponds to a subset of O&D pairs of the O&D pairs; and
      generating, for each aggregated O&D node having at least one corresponding O&D pair of the subset of O&D pairs, an associated duration of stay distribution node in the data structure that includes a duration of stay statistical distribution that is based at least in part on a duration of stay determined for each of the at least one corresponding O&D pair of the subset of O&D pairs; and
    simulating booking demand of a global distribution system for production travel inventory items over a range of simulation days using the demand model.

* * * * *